United States Patent
Kutsumizu et al.

(10) Patent No.: US 11,015,033 B2
(45) Date of Patent: May 25, 2021

(54) EXPANDABLE STYRENE RESIN PARTICLES, PRE-EXPANDED PARTICLES OF STYRENE RESIN, STYRENE RESIN FOAM MOLDED BODY, AND METHOD FOR PRODUCING EXPANDABLE RESIN PARTICLES

(71) Applicant: Kaneka Corporation, Osaka (JP)

(72) Inventors: Ryuta Kutsumizu, Osaka (JP); Shotaro Maruhashi, Osaka (JP); Ryoji Nakayama, Osaka (JP); Yoshihito Yano, Osaka (JP); Kirito Suzuki, Tokyo (JP)

(73) Assignee: KANEKA CORPORATION, Osaka (JP)

( * ) Notice: Subject to any disclaimer, the term of this patent is extended or adjusted under 35 U.S.C. 154(b) by 335 days.

(21) Appl. No.: 15/758,579

(22) PCT Filed: Sep. 9, 2016

(86) PCT No.: PCT/JP2016/076575
§ 371 (c)(1),
(2) Date: Mar. 8, 2018

(87) PCT Pub. No.: WO2017/043618
PCT Pub. Date: Mar. 16, 2017

(65) Prior Publication Data
US 2018/0258247 A1  Sep. 13, 2018

(30) Foreign Application Priority Data

Sep. 9, 2015 (JP) .............................. JP2015-177870
Sep. 9, 2015 (JP) .............................. JP2015-177871
Sep. 9, 2015 (JP) .............................. JP2015-177871

(51) Int. Cl.
| C08J 9/16 | (2006.01) |
| C08L 25/06 | (2006.01) |
| C08J 9/00 | (2006.01) |
| C08J 9/14 | (2006.01) |
| C08J 9/232 | (2006.01) |
| B29K 25/00 | (2006.01) |
| B29K 507/04 | (2006.01) |
| B29C 44/34 | (2006.01) |
| B29C 44/50 | (2006.01) |

(Continued)

(52) U.S. Cl.
CPC ............. *C08J 9/0066* (2013.01); *C08J 9/141* (2013.01); *C08J 9/16* (2013.01); *C08J 9/232* (2013.01); *C08L 25/06* (2013.01); *B29C 44/3461* (2013.01); *B29C 44/50* (2013.01); *B29K 2025/06* (2013.01); *B29K 2105/041* (2013.01); *B29K 2105/251* (2013.01); *B29K 2507/04* (2013.01); *B29K 2995/0015* (2013.01); *B29K 2995/0063* (2013.01); *C08J 2201/03* (2013.01); *C08J 2203/14* (2013.01); *C08J 2325/06* (2013.01)

(58) Field of Classification Search
CPC . C08J 9/0066; C08J 9/141; C08J 9/232; C08J 9/16; C08J 2201/03; C08J 2203/14; C08J 2325/06; C08J 3/226; C08J 9/18; C08L 25/06; B29K 2025/06; B29K 2995/0063; B29K 2507/04; B29K 2105/251; B29K 2995/0015; B29K 2105/041; B29C 44/3461; B29C 44/50; B29C 44/3442; B29C 44/00; C08K 3/04; C08K 2201/005
See application file for complete search history.

(56) References Cited

U.S. PATENT DOCUMENTS

| 6,130,265 | A  | 10/2000 | Glueck et al. |
| 6,340,713 | B1* | 1/2002 | Gluck .................... C04B 16/08 521/146 |
| 6,414,041 | B1 | 7/2002 | Gluck |

(Continued)

FOREIGN PATENT DOCUMENTS

| JP | 2001-522383 A | 11/2001 |
| JP | 2001-525001 A | 12/2001 |

(Continued)

OTHER PUBLICATIONS

Extended European Search Report issued in European Application No. 16844479.2, dated Mar. 14, 2019 (12 pages).
Office Action issued in corresponding Japanese Application No. 2017538534; dated Feb. 4, 2020 (9 pages).

(Continued)

*Primary Examiner* — Kara B Boyle
(74) *Attorney, Agent, or Firm* — Osha Bergman Watanabe & Burton LLP

(57) ABSTRACT

Expandable styrene resin particles include 2.0 wt % to 8.0 wt % of graphite, and the graphite has a mean particle size of 2.5 μm to 9 μm. The expandable styrene resin particles satisfy (i) a laser scattering intensity per unit solution concentration of the graphite is not less than 5 {%/(mg/ml)}/wt %, (ii) an area of the graphite per unit solution concentration of the graphite in 1 mm$^2$ is not less than 55 ({mm$^2$/mm$^2$}/{g/g}), or (iii) when the expandable styrene resin particles are pre-expanded and are made into an expanded molded product having an expansion ratio of 40 times, a value (%/wt %) obtained by dividing, by the content of the graphite (wt %), a percentage of an area occupied by the graphite in a surface layer of the expanded molded product (%), a quotient of which is further multiplied by 100, is not less than 100.

17 Claims, No Drawings

(51) Int. Cl.
   *B29K 105/00*      (2006.01)
   *B29K 105/04*      (2006.01)

(56) References Cited

U.S. PATENT DOCUMENTS

| | | | |
|---|---|---|---|
| 7,714,029 | B2 | 5/2010 | Lee et al. |
| 8,084,510 | B2 | 12/2011 | Morioka et al. |
| 2004/0039073 | A1 | 2/2004 | Gluck |
| 2006/0217452 | A1 | 9/2006 | Inada et al. |
| 2007/0142488 | A1 | 6/2007 | Datko et al. |
| 2009/0030096 | A1 | 1/2009 | Lee et al. |
| 2012/0252914 | A1 | 10/2012 | Hahn et al. |

FOREIGN PATENT DOCUMENTS

| | | | |
|---|---|---|---|
| JP | 2002-530450 A | | 9/2002 |
| JP | 2002-284917 A | | 10/2002 |
| JP | 2004-346281 A | | 12/2004 |
| JP | 2005-002268 A | | 1/2005 |
| JP | 2005-506390 A | | 3/2005 |
| JP | 2008-502750 A | | 1/2008 |
| JP | 2009-536687 A | | 10/2009 |
| JP | 2013-075941 A | | 4/2013 |
| JP | 2013514397 A | | 4/2013 |
| JP | 2013-209608 A | | 10/2013 |
| JP | 2014-118474 A | | 6/2014 |
| JP | 2014118474 A | * | 6/2014 |
| JP | 2014-148558 A | | 8/2014 |
| JP | 2015-113416 A | | 6/2015 |
| JP | 6216506 B2 | | 10/2017 |
| WO | 2011/046698 A1 | | 4/2011 |
| WO | 2013/062760 A1 | | 5/2013 |
| WO | 2014102139 A2 | | 7/2014 |
| WO | 2015-137363 A1 | | 9/2015 |

OTHER PUBLICATIONS

International Search Report issued in corresponding International Application No. PCT/JP2016/076575; dated Oct. 25, 2016 (2 pages).
International Preliminary Report on Patentability issued in corresponding International Application No. PCT/JP2016/076575; dated Mar. 22, 2018 (11 pages).

* cited by examiner

EXPANDABLE STYRENE RESIN PARTICLES, PRE-EXPANDED PARTICLES OF STYRENE RESIN, STYRENE RESIN FOAM MOLDED BODY, AND METHOD FOR PRODUCING EXPANDABLE RESIN PARTICLES

TECHNICAL FIELD

The present invention relates to expandable styrene resin particles, pre-expanded particles of a styrene resin, a styrene resin expanded molded product, and a method for producing expandable resin particles.

BACKGROUND ART

A styrene resin expanded molded product, which is obtained by use of expandable styrene resin particles, is well-balanced foam having light weight, a heat insulating property, a shock-absorbing property, and the like. Conventionally, the styrene resin expanded molded product has been widely used as a food container box, a cool box, a cushioning material, and a heat insulating material for houses and the like.

In recent years, in relation to problems such as global warming, there is growing awareness for energy conservation by improving heat insulating properties of buildings such as a house. It is accordingly anticipated that demands for styrene resin expanded molded products will increase. In addition, various considerations have been made with regard to further improvement of heat insulating properties of styrene resin expanded molded products.

On the other hand, styrene resin expanded molded products as heat insulating materials are in competition with other materials in the market such as glass wool. As such, the production of a styrene resin expanded molded product is expected to achieve a significant reduction of costs. A styrene resin expanded molded product with an expansion ratio of not less than 40 times has a higher thermal conductivity and accordingly undergoes greater degradation in heat insulating property, as the expansion ratio increases. It is therefore desirable to reduce the thermal conductivity of such a styrene resin expanded molded product. A styrene resin expanded molded product having a lower thermal conductivity enables achieving a heat insulating property equivalent to that of a conventional styrene resin expanded molded product with a low expansion ratio, even in a case where the styrene resin expanded molded product with the lower thermal conductivity has an increased expansion ratio. This enables reducing an amount of expandable styrene resin particles used as a raw material, and accordingly enables producing, at low cost, a heat insulating material including a styrene resin expanded molded product.

A foaming agent such as butane or pentane, which is contained in a styrene resin expanded molded product, has an effect of reducing thermal conductivity. It is known that such a foaming agent is lost from the styrene resin expanded molded product over time so as to be replaced with the atmosphere (air), so that a thermal conductivity of the styrene resin expanded molded product increases over time so as to deteriorate the heat insulating property over time.

Under these circumstances, it is expected to maintain a thermal conductivity of a styrene resin expanded molded product to a low level even after a foaming agent, such as butane or pentane, which is contained in the styrene resin expanded molded product is replaced by air.

In connection with improvement of a heat insulating property of a styrene resin expanded molded product, for example, Patent Literature 1 proposes expandable styrene resin particles in which a foaming agent is contained in styrene resin particles having a weight average molecular weight of 300000 to 600000 and a predetermined range of expansion proportion at the time of melt flow measurement and which allow producing a styrene resin expanded molded product having a bulk density of 0.02 g/cm$^3$ to 0.009 g/cm$^3$ and an average cell membrane thickness of 0.8 µm to 2.5 µm.

Also known is a method in which a radiative heat transfer inhibitor (e.g., graphite) is used in a styrene resin expanded molded product. The radiative heat transfer inhibitor is a substance which is capable of inhibiting radiative heat transfer among heat transfer mechanisms that are transmitted in an expanded molded product. The radiative heat transfer inhibitor has an effect of achieving a reduction in thermal conductivity of the expanded molded product as compared with an additive-free expanded molded product that is identical to expanded molded product in terms of resin, foaming agent, cell structure, and density.

Patent Literature 2 proposes expandable styrene resin particles which (i) allow producing, through a treatment, foam having a density of 35 g/L or lower and (ii) contain uniformly distributed graphite powder. A problem caused by the use of graphite powder is a decrease in flame retardancy. Patent Literature 2 proposes a technology in which expandable styrene resin particles contain, as a flame retardant, an organic bromine compound having a bromine content of 70 wt % or more.

Patent Literature 3 describes a styrene resin expanded molded product which has a density of 10 kg/m$^3$ to 100 kg/m$^3$, a closed cell ratio of not less than 60%, and an average cell diameter of 20 µm to 1000 µm and contains 0.05 wt % to 9 wt %/o of graphite powder. This graphite powder has an aspect ratio of not less than 5, a volume mean particle size (D50 particle size) of 0.1 µm to 100 µm, and a specific surface area of not less than 0.7 m$^2$/cm$^3$. A value obtained by dividing a D90 particle size of the graphite powder by a D10 particle size of graphite powder is 1 to 20.

Patent Literature 4 proposes a method for producing expandable styrene resin particles. In the method, seed polymerization of a styrene monomer with styrene resin micropellets containing graphite particles is carried out in the presence of C6 to C10 aromatic hydrocarbons, while introducing a foaming agent therein.

Patent Literature 5 proposes a method for producing expandable styrene resin particles by (i) melting and kneading, in an extruder, a resin composition containing a polystyrene resin, a flame retardant, graphite, and a volatile foaming agent, (ii) extruding a resultant melt and kneaded product from a die into pressurized water, and (iii) cutting a melt and kneaded product thus extruded.

Patent Literature 6 proposes expandable styrene resin particles which contain 0.1 mass % to 25 mass % of graphite having a mean particle size of more than 50 µm.

Patent Literature 7 proposes expandable styrene resin particles in which a flame retardant content in surface layer portions of the expandable styrene resin particles is greater than that in a whole of the expandable styrene resin particles.

Patent Literature 8 proposes expandable styrene resin particles which (i) contain 0.1 mass % to 25 mass % of graphite and a volatile foaming agent that is a mixture of pentane and water and (ii) have a bulk density of more than 600 g/L.

Patent Literature 9 proposes expandable styrene resin particles which contain 3 wt % to 15 wt % of graphite and in which a graphite content in a whole of the expandable styrene resin particles is greater than that in surface layer portions of the expandable styrene resin particles.

Patent Literature 10 proposes a method for producing expandable styrene resin particles by performing polymerization of styrene and, as necessary, a monomer compound that is copolymerizable with styrene, in an aqueous suspension in the presence of graphite particles. Before, during, or after the polymerization, a foaming agent is added.

Patent Literature 11 proposes a method for producing expandable styrene resin particles which are polymerized in an aqueous suspension in the presence of graphite and a nonionic surfactant and have a thermal conductivity of less than 32 mW/m·K and a density of less than 25 g/L as measured at 10° C. in accordance with DIN 52612.

CITATION LIST

Patent Literature

[Patent Literature 1]
Japanese Patent Application Publication, Tokukai, No. 2002-284917 A
[Patent Literature 2]
Japanese Translation of PCT International Publication, Tokuhyo, No. 2001-525001 A
[Patent Literature 3]
Japanese Patent Application Publication, Tokukai, No. 2005-2268 A
[Patent Literature 4]
Japanese Translation of PCT International Publication, Tokuhyo, No. 2009-536687 A
[Patent Literature 5]
Japanese Patent Application Publication, Tokukai, No. 2013-75941 A
[Patent Literature 6]
Japanese Translation of PCT International Publication, Tokuhyo, No. 2002-530450 A
[Patent Literature 7]
Japanese Patent Application Publication, Tokukai, No. 2004-346281 A
[Patent Literature 8]
Japanese Translation of PCT International Publication, Tokuhyo, No. 2005-506390 A
[Patent Literature 9]
Japanese Patent Application Publication, Tokukai, No. 2013-209608 A
[Patent Literature 10]
Japanese Translation of PCT International Publication, Tokuhyo, No. 2001-522383 A
[Patent Literature 11]
Japanese Translation of PCT International Publication, Tokuhyo, No. 2008-502750 A

SUMMARY OF INVENTION

Technical Problem

In the inventions of Patent Literatures 1 through 11, there is still room for improvement in expandability and heat insulating property.

Accordingly, an object of the present invention is to provide (i) expandable styrene resin particles and pre-expanded particles of a styrene resin, each enabling production of a styrene resin expanded molded product having a high expansion ratio and a low thermal conductivity, i.e., having an excellent heat insulating property, (ii) a styrene resin expanded molded product, and (iii) a method for producing expandable resin particles.

Solution to Problem

As a result of diligent studies for solving the foregoing problem, the inventors of the present invention found (i) expandable styrene resin particles and pre-expanded particles of a styrene resin, each enabling production of a styrene resin expanded molded product that has an extremely low thermal conductivity for a long period of time since the production and has an excellent heat insulating property, (ii) a styrene resin expanded molded product, and (iii) a method for producing expandable resin particles. Through the finding, the inventors of the present invention completed the present invention.

In particular, the inventors of the present invention found that the expandable styrene resin particles, the pre-expanded particles of the styrene resin, and the styrene resin expanded molded product of the present invention enable obtaining a styrene resin expanded molded product which, despite having a high content of graphite of 2.0 wt % to 8.0 wt %, has a high expansion ratio and a high closed cell ratio without impairment of surface appearance, has a low thermal conductivity, achieves a significant suppression in increase over time in thermal conductivity, and exhibits a long-lasting excellent heat insulating property.

That is, one embodiment of the present invention relates to expandable styrene resin particles containing graphite, a content of the graphite being 2.0 wt % to 8.0 wt % with respect to 100 wt % of the expandable styrene resin particles, the graphite having a mean particle size of 2.5 µm to 9 µm, in a case where a solution in which the expandable styrene resin particles are dispersed in toluene is subjected to measurement by laser diffractometry with use of a laser beam with a wavelength of 632.8 nm, a laser scattering intensity per unit solution concentration of the graphite being not less than 5 $\{\%/(mg/ml)\}$/wt %.

Further, one embodiment of the present invention relates to expandable styrene resin particles containing graphite, a content of the graphite being 2.0 wt % to 8.0 wt % with respect to 100 wt % of the expandable styrene resin particles, the graphite having a mean particle size of 2.5 µm to 9 µm, in a case where a solution in which the expandable styrene resin particles are dispersed in toluene is subjected to observation with use of an optical microscope, an area of the graphite per unit solution concentration of the graphite in 1 mm$^2$ being not less than 55 $(\{mm^2/mm^2\}/\{g/g\})$.

Further, one embodiment of the present invention relates to expandable styrene resin particles containing graphite, a content of the graphite being 2.0 wt % to 8.0 wt % with respect to 100 wt % of the expandable styrene resin particles, the graphite having a mean particle size of 2.5 µm to 9 µm, in a case where the expandable styrene resin particles further are pre-expanded and are made into an expanded molded product having an expansion ratio of 40 times, a value obtained by dividing, by the content of the graphite, a ratio of an area taken up by the graphite in a surface layer of the expanded molded product being not less than 100.

Further, one embodiment of the present invention relates to a styrene resin expanded molded product containing graphite, a content of the graphite being 2.0 wt % to 8.0 wt % with respect to 100 wt % of the styrene resin expanded molded product, the graphite having a mean particle size of 2.5 µm to 9 µm, in a case where a solution in which the styrene resin expanded molded product is dispersed in toluene is subjected to measurement by laser diffractometry with use of a laser beam with a wavelength of 632.8 nm, a laser scattering intensity per unit solution concentration of the graphite being not less than 5 ({% o/(mg/ml)}/wt %.

Further, one embodiment of the present invention relates to a method for producing expandable resin particles containing graphite, a content of the graphite being 2.0 wt % to 8.0 wt % with respect to 100 wt % of the expandable resin particles, the graphite having a mean particle size of 2.5 µm to 9 µm, the method including: a stirring step of kneading, with use of a kneading device including a twin-screw stirrer, the graphite and a resin under a load of not less than 3.5 kgf/cm$^2$, at a resin temperature of not less than Tg+50° C. (Tg is a glass transition temperature of the resin), and for a duration of kneading of not less than 10 minutes to prepare a master batch; and an extruding step of melting, kneading, and extruding a mixture with use of an extruder, the mixture containing the master batch and a new resin.

Further, one embodiment of the present invention relates to a method for producing expandable resin particles containing graphite, the method using a master batch containing a resin and the graphite which satisfy the following formula (3):

$$b > 1.4a \qquad \text{Formula (3)}$$

where: a is a laser scattering intensity per unit solution concentration of the graphite [({%/(mg/ml)}/wt %] as measured, prior to preparation of the master batch, by subjecting a solution, in which the graphite before being kneaded with the resin is dispersed in a solvent, to measurement by laser diffractometry with use of a laser beam with a wavelength of 632.8 nm; and b is a laser scattering intensity per unit solution concentration of the graphite [{%/(mg/ml)}/wt %] as measured, after the preparation of the master batch, by subjecting a solution, in which the master batch is dispersed in a solvent, to measurement by laser diffractometry with use of a laser beam with a wavelength of 632.8 nm.

Advantageous Effects of Invention

According to one embodiment of the present invention, it is possible to provide a styrene resin expanded molded product having a high expansion ratio and a low thermal conductivity, i.e., having an excellent heat insulating property.

DESCRIPTION OF EMBODIMENTS

The following description will discuss, in more detail, the present invention by way of embodiments in the order of: expandable styrene resin particles and a method for production thereof; pre-expanded particles of a styrene resin and a method for production thereof; and a styrene resin expanded molded product and a method for production thereof.

[1. Expandable Styrene Resin Particles]

Expandable styrene resin particles in accordance with one embodiment of the present invention are expandable styrene resin particles containing graphite, a content of the graphite being 2.0 wt % to 8.0 wt % with respect to 100 wt % of the expandable styrene resin particles, the graphite having a mean particle size of 2.5 µm to 9 µm, in a case where a solution in which the expandable styrene resin particles are dispersed in toluene is subjected to measurement by laser diffractometry with use of a laser beam with a wavelength of 632.8 nm, a laser scattering intensity per unit solution concentration of the graphite being not less than 5 {%/(mg/ml)}/wt %.

Alternatively, expandable styrene resin particles in accordance with one embodiment of the present invention are expandable styrene resin particles containing graphite, a content of the graphite being 2.0 wt % to 8.0 wt % with respect to 100 wt % of the expandable styrene resin particles, the graphite having a mean particle size of 2.5 µm to 9 µm, in a case where a solution in which the expandable styrene resin particles are dispersed in toluene is subjected to observation with use of an optical microscope, an area of the graphite per unit solution concentration of the graphite in 1 mm$^2$ being not less than 55 ({mm$^2$/mm$^2$}/{g/g}).

Alternatively, expandable styrene resin particles in accordance with one embodiment of the present invention are expandable styrene resin particles containing graphite, a content of the graphite being 2.0 wt % to 8.0 wt % with respect to 100 wt % of the expandable styrene resin particles, the graphite having a mean particle size of 2.5 µm to 9 µm, in a case where the expandable styrene resin particles further are pre-expanded and are made into an expanded molded product having an expansion ratio of 40 times, a value obtained by dividing, by the content of the graphite, a ratio of an area taken up by the graphite in a surface layer of the expanded molded product being not less than 100.

The three embodiments described above may be provided individually or in combination. Further, each of the three embodiments described above and a combination thereof may each include the following arrangements.

Expandable styrene resin particles in accordance with one embodiment of the present invention contain a styrene resin, graphite, and a foaming agent, and may contain, as necessary, at least one optional component selected from the group consisting of a flame retardant, a thermal stabilizer, a radical generator, and other additives. Expandable styrene resin particles in accordance with one embodiment of the present invention preferably contain a styrene resin, graphite, a foaming agent, and a flame retardant, and may contain at least one of the optional components described above other than a flame retardant. More preferably, expandable styrene resin particles in accordance with one embodiment of the present invention contain a styrene resin, graphite, a foaming agent, a flame retardant, and a thermal stabilizer, and may contain at least one of the optional components described above other than a flame retardant and a thermal stabilizer. Further more preferably, expandable styrene resin particles in accordance with one embodiment of the present invention contain a styrene resin, graphite, a foaming agent, a flame retardant, a thermal stabilizer, and a nucleating agent, and may contain at least one of the optional components described above other than a flame retardant, a thermal stabilizer, and a nucleating agent.

Expandable styrene resin particles in accordance with one embodiment of the present invention are arranged such that in a case where the expandable styrene resin particles are made into an expanded molded product having an expansion ratio of 50 times, the expanded molded product has a thermal conductivity of preferably not more than 0.0310 (W/mK), more preferably not more than 0.0308 (W/mK), further more preferably not more than 0.0305 (W/mK) as measured, at a central temperature of 23° C., in accordance with JIS A9511:2006R after the expanded molded product is left to stand still at a temperature of 50° C. for 30 days and further left to stand still at a temperature of 23° C. for 24 hours. This arrangement enables a further improvement in heat insulating property.

Expandable styrene resin particles in accordance with one embodiment of the present invention are arranged such that in a case where the expandable styrene resin particles are made into an expanded molded product having an expansion ratio of 70 times, the expanded molded product has a thermal conductivity of preferably not more than 0.0324 (W/mK), more preferably not more than 0.0320 (W/mK), further more preferably not more than 0.0317 (W/mK), as measured, at a central temperature of 23° C., in accordance with JIS A9511:2006R after the expanded molded product is left to stand still at a temperature of 50° C. for 30 days and further left to stand still at a temperature of 23° C. for 24 hours. This arrangement enables a further increase in expansion ratio and a further improvement in heat insulating property.

Expandable styrene resin particles in accordance with one embodiment of the present invention are preferably arranged such that in a case where the expandable styrene resin particles are pre-expanded and are made into an expanded molded product having an expansion ratio of 50 times, the expanded molded product has an average cell diameter of 70 μm to 250 μm. The average cell diameter is more preferably 90 μm to 200 μm, further more preferably 100 μm to 180 g±m. This arrangement enables obtaining a styrene resin expanded molded product having a further enhanced heat insulating property.

The following description will discuss, in further detail, essential components and optional components contained in expandable styrene resin particles in accordance with one embodiment of the present invention.

(1-1. Styrene Resin)

A styrene resin for use in one embodiment of the present invention may be not only a styrene homopolymer (polystyrene homopolymer) but also a copolymer of (i) styrene and (ii) other monomer(s), which is/are copolymerizable with styrene, or a derivative of the other monomer(s), provided that the effects of one embodiment of the present invention are not impaired. Note, however, that a brominated styrene-butadiene copolymer, which will be described later, is excluded.

Examples of the other monomer(s) copolymerizable with styrene or the derivative of the other monomer(s) encompass: a styrene derivative such as methylstyrene, dimethylstyrene, ethylstyrene, diethylstyrene, isopropyl styrene, bromostyrene, dibromostyrene, tribromostyrene, chlorostyrene, dichlorostyrene, and trichlorostyrene; a multifunctional vinyl compound such as divinylbenzene; a (meta)polyacrylic acid ester compound such as methyl acrylate, methyl methacrylate, ethyl acrylate, ethyl methacrylate, butyl acrylate, and butyl methacrylate; a vinyl-cyanide compound such as (meta)acrylonitrile; a diene compound such as butadiene, or a derivative thereof; an unsaturated carboxylic acid anhydride such as maleic anhydride and itaconic acid anhydride; and an N-alkyl-substituted maleimide compound such as N-methylmaleimide, N-butylmaleimide, N-cyclo hexylmaleimide, N-phenylmaleimide, N-(2)-chlorophenyl-maleimide, N-(4)-bromophenylmaleimide, and N-(1)-naphtylmaleimide. These can be used alone or in combination of two or more thereof.

The styrene resin for use in one embodiment of the present invention is not limited to the styrene homopolymer and/or a copolymer of (i) styrene and (ii) the other monomer(s), which is/are copolymerizable with styrene, or the derivative of the other monomer(s). The styrene resin for use in one embodiment of the present invention may be a blend with (i) a homopolymer of the other monomer(s) or the derivative thereof or (ii) a copolymer of the other monomer(s) or the derivative thereof, provided that the effects of one embodiment of the present invention are not impaired.

In the styrene resin for use in one embodiment of the present invention, for example, diene rubber-reinforced polystyrene, acrylic rubber-reinforced polystyrene, and/or a polyphenylene ether resin may also be blended.

Among examples of the styrene resin for use in one embodiment of the present invention, a styrene homopolymer, a styrene-acrylonitrile copolymer, or a styrene-butyl acrylate copolymer is preferable because of (i) being relatively inexpensive, (ii) being able to be expanded and molded using low-pressure steam or the like without use of a special method, and (iii) being well balanced in heat insulating property, flame retardancy, and shock-absorbing property.

(1-2. Graphite)

In one embodiment of the present invention, adding graphite to expandable styrene resin particles as a radiative heat transfer inhibitor allows producing a styrene resin expanded molded product having an excellent heat insulating property. The radiative heat transfer inhibitor means a substance which has a property of reflecting, scattering, or absorbing light in a near-infrared or infrared region (e.g., a wavelength region of approximately 800 nm to 3000 nm).

Examples of graphite for use in one embodiment of the present invention encompass scale-like graphite, earthy graphite, spherical graphite, artificial graphite, or the like. Note that the term "scale-like" herein also encompasses flake, slice, and plate-like shapes. These graphites can be used alone or in combination of two or more thereof. In particular, a graphite mixture containing scale-like graphite as a main component is preferable because of having an excellent radiative heat transfer suppression effect, and scale-like graphite is more preferable.

The graphite for use in one embodiment of the present invention has a mean particle size of preferably 2.5 μm to 9 μm, more preferably 3 μm to 6 μm, most preferably 4 μm to 6 μm. A mean particle size of graphite herein is defined such that, when measurement and analysis of particle size distribution is performed by laser diffractometry based on Mie theory according to ISO13320:2009, JIS Z8825-1, a particle size (a volume mean particle size according to the laser diffractometry) corresponding to a case in which a cumulative volume accounts for 50% of a volume of all particles is referred to as a mean particle size.

Production cost of graphite decreases as a mean particle size of the graphite increases. In particular, graphite having a mean particle size of not less than 2.5 μm can be produced at low cost including a cost for pulverization, and therefore is very inexpensive, so that expandable styrene resin particles tend to be produced at a reduced cost. Further, in a case where graphite has a mean particle size of not less than 2.5 μm, a styrene resin expanded molded product having a good heat insulating property can be produced from expandable styrene resin particles obtained. In a case where graphite has a mean particle size of not more than 9 μm, cell membranes are not easily broken during production of pre-expanded particles and a styrene resin expanded molded product from expandable styrene resin particles, so that a high expansion ratio tends to be easily achieved, molding tends to be facilitated, and a compressive strength of the styrene resin expanded molded product tends to be increased.

In a case where graphite has a mean particle size of not less than 3 μm, a further reduction in thermal conductivity can be achieved as well as a resultant excellent heat insulating property. In a case where graphite has a mean particle size of not more than 6 μm, a molded product has an excellent surface appearance, a lower thermal conductivity, and a more excellent heat insulating property resulting from the lower thermal conductivity.

Expandable styrene resin particles in one embodiment of the present invention is preferably arranged such that a content of graphite is not less than 2.0 wt % and not more than 8.0 wt % with respect to 100 wt % of the expandable styrene resin particles, in order to have a good balance between (i) easy control for achieving a target expansion ratio, (ii) a thermal conductivity reducing effect, and (iii) the like. In a case where the content of graphite is not less than 2.0 wt %, a sufficient thermal conductivity reducing effect tends to be achieved. Meanwhile, in a case where the content of graphite is not more than 8.0 wt %, cell membranes are not easily broken during production of pre-expanded particles and a styrene resin expanded molded product from expandable styrene resin particles, so that a high expansion ratio tends to be easily achieved and control of an expansion ratio tends to be facilitated.

It is preferable that the content of graphite in the expandable styrene resin particles be not less than 3.0 wt % and not more than 7.0 wt %. In a case where the content of graphite is not less than 3.0 wt/n %, a lower thermal conductivity and a resultant more excellent heat insulating property can be achieved. In a case where the content of graphite is not more than 7.0 wt %, a good expandability and a good surface appearance of the molded product can be achieved.

Conventional graphite-containing expandable styrene resin particles have a low laser scattering intensity per unit solution concentration of graphite as measured by laser diffractometry, and thus have a low thermal conductivity reducing effect relative to an amount of the graphite. In one embodiment of the present invention, a laser scattering intensity per unit solution concentration of graphite as measured by laser diffractometry is increased. This allows obtaining a styrene resin expanded molded product having a low thermal conductivity, which is not obtainable from the conventional graphite-containing expandable styrene resin particles.

Further, the conventional graphite-containing expandable styrene resin particles have a small area of the graphite per unit solution concentration of the graphite in 1 mm² as observed by an optical microscope, and thus have a low thermal conductivity reducing effect relative to the amount of the graphite. In one embodiment of the present invention, an area of the graphite per unit solution concentration of the graphite in 1 mm² as observed by an optical microscope is increased. This allows obtaining a styrene resin expanded molded product having a low thermal conductivity, which is not obtainable from the conventional graphite-containing expandable styrene resin particles.

Further, in the conventional graphite-containing expandable styrene resin particles, in a case where the expandable styrene resin particles are pre-expanded and are made into an expanded molded product having an expansion ratio of 40 times, a value obtained by dividing, by the content of graphite, a ratio of an area taken up by the graphite in a surface layer of the expanded molded product is low. The conventional graphite-containing expandable styrene resin particles thus have a low thermal conductivity reducing effect relative to the amount of the graphite. In one embodiment of the present invention, a value obtained by dividing, by the content of graphite, a ratio of an area taken up by the graphite in a surface layer of the expanded molded product is increased. This allows obtaining a styrene resin expanded molded product having a low thermal conductivity, which is not obtainable from the conventional graphite-containing expandable styrene resin particles.

(1-3. Laser Scattering Intensity)

A laser scattering intensity per unit solution concentration of graphite in accordance with one embodiment of the present invention is obtained as follows. First, on the basis of an intensity Lb of transmitted light in a case where a toluene solution containing no expandable styrene resin particles is irradiated with a He—Ne laser beam having a wavelength of 632.8 nm and an intensity Ls of transmitted light in a case where a toluene solution containing expandable styrene resin particles having a predetermined weight is irradiated with a He—Ne laser beam having a wavelength of 632.8 nm, a laser scattering intensity Ob (%) is found in accordance with the following formula: Ob=(1−Ls/Lb)× 100. Subsequently, on the basis of the laser scattering intensity Ob thus found, a laser scattering intensity per unit solution concentration of the expandable styrene resin particles is found. Then, the laser scattering intensity per unit solution concentration thus found is divided by a content (wt %) of graphite in the expandable styrene resin particles having the predetermined weight. A laser scattering intensity thus found is the laser scattering intensity per unit solution concentration of graphite.

It is preferable that expandable styrene resin particles in accordance with one embodiment of the present invention have a laser scattering intensity per unit solution concentration of graphite of not less than 5 {%/(mg/ml)}/wt %. In a case where the laser scattering intensity is not less than 5 {%/(mg/ml)}/wt %, a high thermal conductivity reducing effect relative to a content of graphite can be achieved. That is, a high expansion ratio as well as a low thermal conductivity and a resultant excellent heat insulating property can be achieved. The laser scattering intensity per unit solution concentration of the graphite is more preferably not less than 6 {%/(mg/ml)}/wt %, further more preferably not more than 9 {%/(mg/ml)}/wt %. In a case where the laser scattering intensity is not less than 6%, a more sufficient thermal conductivity reducing effect can be achieved. That is, a lower thermal conductivity and a resultant more excellent heat insulating property can be achieved. In a case where the laser scattering intensity is not more than 9 {%/(mg/ml)}/wt %, kneading does not reduce a mean particle size of graphite too much, and it accordingly becomes easier to achieve a thermal conductivity improving effect.

In a case where the laser scattering intensity per unit solution concentration of graphite is expressed as X {%/(mg/ml)}/wt % and the mean particle size of the graphite is expressed as Y (μm), it is preferable that X+Y>10, and it is more preferable that X+Y>11. As the mean particle size Y decreases, the number of particles of graphite per unit solution concentration tends to increase and the laser scattering intensity X tends to increase. Meanwhile, in a case where the mean particle size is small, a higher laser scattering intensity is required in order to exhibit a low thermal conductivity. Due to a relationship between the mean particle size and the laser scattering intensity, the thermal conductivity improving effect tends to be magnified in a case where a sum of the mean particle size and the laser scattering intensity exceeds a predetermined value.

(1-4. Graphite Area)

Expandable styrene resin particles in accordance with one embodiment of the present invention are preferably arranged such that in a case where a solution in which the expandable styrene resin particles are dispersed in toluene is observed by an optical microscope, an area of graphite per unit solution concentration in 1 mm² is not less than 55 ({mm²/mm²}/(g/g)). In a case where the area of graphite is not less than 55 ({mm²/mm²}/{g/g}), a high thermal conductivity reducing effect relative to an amount of the graphite introduced can be achieved. That is, a high expansion ratio as well as a low thermal conductivity and a resultant excellent heat insulating property can be achieved.

The area of graphite is preferably not less than 60 ($(mm^2/mm^2)/\{g/g\}$), more preferably not more than 90 ($\{mm^2/mm^2\}/(g/g)$). In a case where the area of graphite is not less than 60 ($\{mm^2/mm^2\}/\{g/g\}$), a more sufficient thermal conductivity reducing effect can be achieved. That is, a lower thermal conductivity and a resultant more excellent heat insulating property can be achieved. In a case where the area of graphite is not more than 90 ($(mm^2/mm^2)/\{g/g\}$), kneading does not reduce a mean particle size of the graphite too much, and it accordingly becomes easier to achieve a thermal conductivity improving effect.

The area of graphite is preferably measured from an image obtained by further subjecting an image, which is observed at a magnification of 300, to an HDR processing.

(1-5. Value Obtained by Dividing Ratio of Area Taken Up by Graphite by Content of Graphite)

Expandable styrene resin particles in accordance with one embodiment of the present invention are preferably arranged such that in a case where the expandable styrene resin particles are pre-expanded and are made into an expanded molded product having an expansion ratio of 40 times, a value obtained by dividing, by the content of graphite, a ratio of an area taken up by the graphite in a surface layer of the expanded molded product is not less than 100. If the value is not less than 100, a high thermal conductivity reducing effect relative to an amount of the graphite introduced can be achieved. That is, a high expansion ratio as well as a low thermal conductivity and a resultant excellent heat insulating property can be achieved.

Further, it is more preferable that in a case where the expandable styrene resin particles are pre-expanded and are made into an expanded molded product having an expansion ratio of 40 times, a value obtained by dividing, by the content of graphite, a ratio of an area taken up by the graphite in a surface layer of the expanded molded product be not less than 110, since this arrangement makes it easier to obtain an expanded molded product having a lower thermal conductivity and a resultant more excellent heat insulating property.

(1-6. Foaming Agent)

A foaming agent for use in one embodiment of the present invention is not particularly limited, but preferably is a C4-C6 hydrocarbon from a viewpoint of achieving a good balance between expandability and product life as well as easily achieving a high expansion ratio in actual use. In a case where the foaming agent has 4 or more carbon atoms, volatility is decreased so as to prevent the foaming agent from being easily lost from the expandable styrene resin particles. Accordingly, in actual use, a sufficient amount of the foaming agent remains in a foaming step. This allows achieving a sufficient expandability, and facilitates achieving a high expansion ratio. This is why the foaming agent having 4 or more carbon atoms is preferable. Further, in a case where the foaming agent has 6 or less carbon atoms, a boiling point of the foaming agent is not too high. This tends to allow a sufficient expandability to be easily achieved through heating at the time of pre-expansion, and accordingly allow a high expansion ratio to be easily achieved. Examples of the C4-C6 hydrocarbon encompass hydrocarbons such as normal butane, isobutane, normal pentane, isopentane, neopentane, cyclopentane, normal hexane, or cyclohexane. These can be used alone or in combination of two or more thereof. The foaming agent is preferably a C4-C5 hydrocarbon.

An amount of the foaming agent added in one embodiment of the present invention is preferably 4 to 10 parts by weight with respect to 100 parts by weight of the styrene resin. This arrangement enables achieving a better balance between foaming speed and expandability, and thus allows achieving a high expansion ratio more stably. In a case where an amount of the foaming agent added is not less than 4 parts by weight, sufficient expandability for foaming is secured so as to allow a high expansion ratio to be easily achieved. This is likely to allow easily producing a styrene resin expanded molded product having a high expansion ratio of 50 times or more. Further, in a case where an amount of the foaming agent is not more than 10 parts by weight, a good flame retardancy as well as a reduction in time (molding cycle) for production of a styrene resin expanded molded product are achieved. This is likely to result in a reduction in production cost. Note that an amount of the foaming agent added is preferably 4.5 parts by weight to 9 parts by weight, more preferably 5 parts by weight to 8 parts by weight, with respect to 100 parts by weight of the styrene resin.

(1-7. Flame Retardant)

A flame retardant for use in one embodiment of the present invention is not particularly limited, and may be any flame retardant which is conventionally used in a styrene resin expanded molded product. In particular, a bromine flame retardant, which has a high flame retardancy imparting effect, is preferable. Examples of the bromine flame retardant for use in one embodiment of the present invention encompass: a brominated bisphenol compound such as 2,2-bis[4-(2,3-dibromo-2-methylpropoxy)-3,5-dibromophenyl]propane (also referred to as tetrabromobisphenol A-bis (2,3-dibromo-2-methylpropyl ether)) or 2,2-bis[4-(2,3-dibromopropoxy)-3,5-dibromophenyl]propane (also referred to as tetrabromobisphenol A-bis(2,3-dibromopropyl ether)); a brominated butadiene-vinyl aromatic hydrocarbon copolymer (disclosed, for example, in Japanese Translation of PCT International Publication, Tokuhyo, No. 2009-516019 A) such as a brominated styrene-butadiene block copolymer, a brominated random styrene-butadiene copolymer, or a brominated styrene-butadiene graft copolymer; and the like. These bromine flame retardants can be used alone or in combination of two or more thereof.

The bromine flame retardant has a bromine content of preferably not less than 0.8 wt %, more preferably not more than 5.0 wt %/o, with respect to a total amount of a styrene resin expanded molded product, in order to have a good balance between (i) easy control for achieving a target expansion ratio, (ii) flame retardancy at the time of adding a radiative heat transfer inhibitor, and (iii) the like. In a case where the bromine content is not less than 0.8 wt %, a flame retardancy imparting effect tends to be increased. In a case where the bromine content is not more than 5.0 wt %, a styrene resin expanded molded product obtained is likely to have an increased strength. More preferably, bromine is added to the expandable styrene resin particles so as to achieve a bromine content of 1.0 wt % to 3.5 wt %.

(1-8. Thermal Stabilizer)

In expandable styrene resin particles in accordance with one embodiment of the present invention, further use of a thermal stabilizer in combination allows suppressing (i) degradation of flame retardancy due to decomposition of a bromine flame retardant during a production process and (ii) deterioration of the expandable styrene resin particles.

A thermal stabilizer in accordance with one embodiment of the present invention can be used in combination as appropriate in accordance with a type of a styrene resin used, a type and a content of a foaming agent, a type and a content of a radiative heat transfer inhibitor, a type and a content of a bromine flame retardant, and the like.

A thermal stabilizer for use in one embodiment of the present invention is preferably a hindered amine compound, a phosphorous compound, or an epoxy compound in terms of allowing discretionarily controlling a 1% weight-reduction temperature in thermogravimetric analysis of a bromine flame retardant-containing mixture. Thermal stabilizers of various types can be used alone or in combination of two or more thereof. Note that these thermal stabilizers can be used also as a light-resistant stabilizer, as described alter.

(1-9. Radical Generator)

Expandable styrene resin particles in accordance with one embodiment of the present invention can exhibit a high flame retardancy by further containing a radical generator which in combination with a bromine flame retardant.

A radical generator in one embodiment of the present invention may be used in combination as appropriate in accordance with a type of a styrene resin used, a type and a content of a foaming agent, a type and a content of a radiative heat transfer inhibitor, and a type and a content of a bromine flame retardant.

Examples of a radical generator for use in one embodiment of the present invention encompass cumene hydroperoxide, dicumyl peroxide, t-butylhydroperoxide, 2,3-dimethyl-2,3-diphenylbutane, poly-1,4-isopropyl benzene, or the like. Radical generators of various types can be used alone or in combination of two or more thereof.

(1-10. Other Additives)

Expandable styrene resin particles in accordance with one embodiment of the present invention may contain, as necessary, one or more other additives selected from the group consisting of a processing aid, a light-resistant stabilizer, a nucleating agent, a foaming aid, an antistatic agent, and a colorant such as a pigment, provided that the effects of one embodiment of the present invention are not impaired.

Examples of the processing aid encompass sodium stearate, magnesium stearate, calcium stearate, zinc stearate, barium stearate, liquid paraffin, or the like.

Examples of the light-resistant stabilizer encompass not only hindered amines, a phosphoric stabilizer, and an epoxy compound which have been described above, but also a phenolic antioxidant, a nitrogen stabilizer, a sulfuric stabilizer, benzotriazoles, and the like.

Examples of the nucleating agent encompass: an inorganic compound such as silica, silicate calcium, wollastonite, kaolin, clay, mica, zinc oxide, calcium carbonate, sodium hydrogen carbonate, talc, or the like; a high-molecular compound such as a methyl methacrylate copolymer or an ethylene-vinyl acetate copolymer resin; an olefin-based wax such as a polyethylene wax; fatty acid bisamide such as methylenebisstearylamide, ethylenebisstearylamide, hexamethylenebispalmitic acid amide, or ethylenebis oleic amide; or the like.

As the foaming aid, a solvent having a boiling point of not higher than 200° C. under atmospheric pressure can be desirably used. Examples of the foaming acid encompass an aromatic hydrocarbon such as styrene, toluene, ethylbenzene, or xylene; an alicyclic hydrocarbon such as cyclohexane or methylcyclohexane; or an acetic ester such as ethyl acetate or butyl acetate; or the like.

Note that the antistatic agent and the colorant are not particularly limited, and can be ones that are used for various resin compositions.

Various types of each of these other additives can be used alone or in combination of two or more thereof.

[2. Method for Producing Expandable Resin Particles]

Examples of a method, in accordance with one embodiment of the present invention, for producing expandable resin particles encompass: a melting and kneading method in which a resin and various components are melt and kneaded with use of an extruder, and then a resultant mixture is cut into particles; a polymerization method in which a resin monomer is subjected to suspension polymerization in the presence of graphite.

The method for producing expandable resin particles is preferably the melting and kneading method in which a resin and various components are melt and kneaded with use of an extruder, and then a resultant mixture is cut into particles. The melting and kneading method in accordance with one embodiment of the present invention encompass a first melting and kneading method and a second melting and kneading method below, which can be selected as appropriate.

The first melting and kneading method can be a method in which a resin, graphite, and a foaming agent are melt and kneaded with use of an extruder, a melt and kneaded product thus obtained is extruded through a die, which is attached to a tip of the extruder and has small holes, into a cutter chamber filled with pressurized circulating water, and immediately after the melt and kneaded product is extruded, the melt and kneaded product is cut with use of a rotating cutter while being cooled by the pressurized circulating water so as to be solidified. Note here that the melting and kneading by the extruder can be carried out (i) with use of a single extruder, (ii) with use of a plurality of extruders which are connected with each other, or (iii) with combined use of an extruder and a second kneading device such as a static mixer or a stirrer including no screw, and these cases can be selected as appropriate.

More specifically, the first melting and kneading method can be carried out in such a manner that, first, (i) a resin, (ii) a foaming agent consisting of hydrocarbon, (iii) graphite, (iv) as necessary, a bromine flame retardant, a radical generator, and a thermal stabilizer, and further (v) as necessary, other additive(s) are melt and kneaded in a first extruder and, as necessary, in a second kneading device accompanying the extruder. A melt and kneaded product thus obtained is cooled to a predetermined temperature as necessary, and then is extruded through a die, which has small holes, into a cutter chamber filled with pressurized circulating water, and immediately after the melt and kneaded product is extruded, the melt and kneaded product is cut into pellets with use of a rotating cutter, while the pellets (resin particles) obtained are cooled by the pressurized circulating water so as to be solidified to obtain expandable styrene resin particles.

A temperature set in a melting and kneading section of the extruder in the first melting and kneading method is preferably 100° C. to 250° C. A duration of time during which the resin and the various components stay inside the extruder from supply of the resin and the various components into the extruder to completion of the melting and kneading is preferably not more than 10 minutes.

In a case where the temperature set in the melting and kneading section of the extruder is not higher than 250° C. and/or in a case where the duration of stay inside the extruder is not more than 10 minutes, decomposition of the bromine flame retardant does not easily occur, so that a desired flame retardancy can be achieved. This yields an effect that it is not necessary to add an excessive amount of a flame retardant in order to impart a desired flame retardancy.

Meanwhile, in a case where the temperature set in the melting and kneading section of the extruder is not less than 100° C., load on the extruder is reduced, so that stable extrusion is realized.

Note here that in a case where an extruder(s) including a single-screw or a double-screw is/are used, "the melting and kneading section of the extruder" means a portion extending from a feed section to a tip of a final extruder in the downstream. In a case where a first extruder and a second kneading device such as a static mixer or a stirrer including no screw are used together, "the melting and kneading section of the extruder" means a portion extending from a feed section of the first extruder to a tip of the second kneading device.

A melt resin (melt and kneaded product), which is in the extruder and in which (i) a foaming agent, (ii) a radiative heat transfer inhibitor, and (iii) as necessary, a bromine flame retardant, a thermal stabilizer, and other additive(s) such as a nucleating agent are dissolved or uniformly dispersed in a resin, is cooled to an appropriate temperature as necessary, and is extruded into pressurized cooling water through a die having a plurality of small holes.

The die used in the first melting and kneading method is not particularly limited, but can be, for example, one which has small holes each having a diameter of 0.3 mm to 2.0 mm, preferably 0.4 mm to 1.0 mm.

In the first melting and kneading method, a temperature of the melt resin immediately before being extruded through the die is preferably not less than Tg+40° C., more preferably Tg+40° C. to Tg+100° C., and further more preferably Tg+50° C. to Tg+70° C., where Tg is a glass transition temperature of the resin in a state where the resin contains no foaming agent.

In a case where the temperature of the melt resin immediately before being extruded from the die is not less than Tg+40° C., the melt resin extruded has a low viscosity, so that the small holes are clogged less frequently, and deformation of obtained resin particles due to a decrease in actual open hole rate of the small holes is less likely to occur. Meanwhile, in a case where the temperature of the melt resin immediately before being extruded from the die is not more than Tg+100° C., the melt resin extruded is more easily solidified, and thus undesirable expansion of the melt resin is suppressed. Furthermore, a viscosity of the melt resin extruded is not too low, so that the melt resin can be cut by the rotating cutter more stably without being easily tangled around the rotating cutter.

A cutting device which cuts the melt resin extruded into the circulating pressurized cooling water in the first melting and kneading method is not particularly limited, but can be, for example, a device which allows the melt resin to be cut by a rotating cutter, which is in contact with a lip of the die, into particles so as to be transferred, without being expanded, in the pressurized circulating cooling water to the centrifugal dehydrator so as to be dewatered and collected.

An advantage of the first melting and kneading method is that production can be performed in the same facility up to production of expandable resin particles, so that a reduction in running cost can be achieved as compared with the second melting and kneading method which will be described next. On the other hand, since an amount of graphite and a particle size of the graphite affects an open hole rate of the small holes of the die, the first melting and kneading method has a lower level of stability in production as compared with the second melting and kneading method which will be described next.

The second melting and kneading method can be a method in which a resin and graphite are melt and kneaded with use of an extruder, a resultant melt and kneaded product is cut by a cold cutting method or a hot cutting method into resin pellets, and then the resin pellets are suspended in water while a foaming agent is caused to be contained in the resin pellets.

More specifically, the second melting and kneading method can be carried out in such a manner that, first, (i) a resin, (ii) graphite, (iii) as necessary, various components such as a bromine flame retardant, a radical generator, and a thermal stabilizer, and further (iv) as necessary, other additive(s), are melt and kneaded with use of an extruder. Subsequently, the melt and kneaded product is extruded through a die, which has small holes, and is cut by a cutter into resin particles. Then, the resin particles are suspended in water while a foaming agent consisting of hydrocarbon is supplied to obtain expandable resin particles.

A temperature set in a melting and kneading section of the extruder in the second melting and kneading method is preferably 100° C. to 250° C. A duration of time during which materials stay inside the extruder from supply of the materials into the extruder to completion of the melting and kneading is preferably not more than 10 minutes.

In a case where the temperature set in the melting and kneading section of the extruder is not higher than 250° C. and/or in a case where the duration of stay inside the extruder is not more than 10 minutes, decomposition of the bromine flame retardant does not easily occur, so that a desired flame retardancy can be achieved. This yields an effect that it is not necessary to add an excessive amount of a flame retardant in order to impart a desired flame retardancy.

Meanwhile, in a case where the temperature set in the melting and kneading section of the extruder is not less than 100° C., load on the extruder is reduced, so that stable extrusion is realized.

The die used in the second melting and kneading method is not particularly limited, but can be, for example, one which has small holes each having a diameter of 0.3 mm to 2.0 mm, preferably 0.8 mm to 1.6 mm.

The second melting and kneading method have advantages that (i) resin particles can be impregnated with a foaming agent with use of a device that is used in general production of expandable resin particles, so that a significant amount of investment for facility or change of facility is unnecessary and that (ii) a high level of stability in production of resin particles can be attained even in a case where an amount of graphite, a particle size of the graphite, and the like are changed. Meanwhile, since production of resin particles and production of expandable resin particles are conducted in respective different plants in the second melting and kneading method, the running cost is higher than that in the first melting and kneading method.

In a method, in accordance with one embodiment of the present invention, for producing expandable resin particles, it is preferable to use a master batch in which a resin and graphite are kneaded in advance.

Accordingly, a method, in accordance with one embodiment of the present invention, for producing expandable resin particles is a method for producing expandable resin particles containing graphite, a content of the graphite being 2.0 wt % to 8.0 wt % with respect to 100 wt % of the expandable resin particles, the graphite having a mean particle size of 2.5 μm to 9 μm, the method including: a stirring step of kneading, with use of a kneading device including a twin-screw stirrer, the graphite and a resin under a load of not less than 3.5 kgf/cm$^2$, at a resin temperature of not less than Tg+50° C. (Tg is a glass transition temperature of the resin), and for a duration of kneading of not less than 10 minutes to prepare a master batch; and an extruding step of melting, kneading, and extruding a mixture with use of an extruder, the mixture containing the master batch and a new resin.

Alternatively, a method, in accordance with one embodiment of the present invention, for producing expandable resin particles is a method for producing expandable resin particles containing graphite, the method using a master batch containing a resin and the graphite which satisfy the following formula (3):

$$b > 1.4a \qquad \text{Formula (3)}$$

where:
a is a laser scattering intensity per unit solution concentration of the graphite [{%/(mg/ml)}/wt %] as measured, prior to preparation of the master batch, by subjecting a solution, in which the graphite before being kneaded with the resin is dispersed in a solvent, to measurement by laser diffractometry with use of a laser beam with a wavelength of 632.8 nm; and b is a laser scattering intensity per unit solution concentration of the graphite [{%/(mg/ml)}/wt %] as measured, after the preparation of the master batch, by subjecting a solution, in which the master batch is dispersed in a solvent, to measurement by laser diffractometry with use of a laser beam with a wavelength of 632.8 nm.

Note here that a method, in accordance with one embodiment of the present invention, for producing expandable resin particles preferably includes: a stirring step of kneading the resin and the graphite with use of a kneading device including a twin-screw stirrer to prepare the master batch; and an extruding step of melting, kneading, and extruding a mixture with use of an extruder, the mixture containing the master batch and a new resin.

Due to kneading of the resin and the graphite, the laser scattering intensity per unit solution concentration of the graphite is increased. Accordingly, it is necessary that the laser scattering intensity per unit solution concentration of the graphite before being kneaded a {%/(mg/ml)}/wt % and the laser scattering intensity of the graphite after being kneaded b {%/(mg/ml)}/wt % satisfy a relation: b>a. If, on the contrary, b≤a, it is not easy to achieve a high thermal conductivity reducing effect relative to an amount of the graphite introduced. In particular, b>1.4a is preferable, since the thermal conductivity reducing effect tends to increase when b>1.4a.

Each of the above-described method for producing expandable resin particles is preferably arranged such that a condition of kneading in the stirring step is a load of not less than 3.5 kgf/cm$^2$, a resin temperature of not lower than 160° C., and a duration of kneading of not less than 10 minutes.

Also in a case where a method, in accordance with one embodiment of the present invention, for producing expandable resin particles uses a master batch containing graphite, the first melting and kneading method and the second melting and kneading method can be used.

That is, it is possible to knead a resin and graphite with use of a kneading device including a twin-screw stirrer (e.g., a Banbury mixer etc.) to prepare a master batch; and melt and knead the master batch prepared, a new resin, and, as necessary, other component(s) with use of an extruder. Subsequently, a resultant melt and kneaded product can be subjected to steps similar to those of the above-described first or second melting and kneading method to obtain expandable resin particles.

Note that "new resin" means a resin which is further added to the master batch. The expression "new resin" is used to distinguish between a resin which is already contained in the master batch and a resin which is further added to the master batch.

More specifically, first, a resin and graphite can be kneaded with use of a kneading device (e.g., an intensive mixer, an internal mixer, or a Banbury mixer, which are capable of kneading a resin while applying a load) including a twin-screw stirrer. In this case, a concentration of the master batch is not particularly limited, but the master batch is preferably prepared with a concentration of graphite of 20 wt % to 80 wt %, in view of a balance between kneading property and cost. Subsequently, (i) the master batch prepared, (ii) a new resin, and (iii) as necessary, a foaming agent consisting of hydrocarbon, a bromine flame retardant, a radical generator, a thermal stabilizer, and other additive(s), can be melt and kneaded with use of a first extruder and, as necessary, with use of a second kneading device accompanying the extruder. A resultant melt and kneaded product can be subjected to steps similar to those of the above-described first or second melting and kneading method to obtain expandable resin particles.

Kneading of a resin and graphite with use of the kneading device including the twin-screw stirrer is preferably carried out under a load of not less than 3.5 kgf/cm$^2$ for not shorter than 10 minutes and ended at a resin temperature of not less than Tg+50*C, and is more preferably carried out under a load of not less than 4 kgf/cm$^2$ for not shorter than 15 minutes and ended at a resin temperature of not less than Tg+50° C. The resin temperature is preferably not higher than 300° C., from a viewpoint of avoiding decomposition of the resin. The kneading device such as the Banbury mixer can increase a mixing performance by application of a load. Further, in a case where the kneading is performed for not shorter than 15 minutes, the resin in the Banbury mixer can have a viscosity that allows the resin to be easily mixed with the graphite. This allows the graphite to be sufficiently dispersed in the resin particles, and accordingly makes it easier to achieve a low thermal conductivity.

In a case where the load is not less than 4 kgf/cm$^2$, a low thermal conductivity can be obtained easily. That is, graphite in the resin is sufficiently kneaded, so that (i) the laser scattering intensity can be increased, (ii) an area of the graphite can be increased, or (iii) a ratio of an area taken up by the graphite in a surface layer of an expanded molded product can be increased.

It is also preferable that the above-described stirring step in which a master batch is prepared includes kneading under a load of not less than 5 kgf/cm$^2$ for not shorter than 20 minutes.

Kneading under a load of 5 kgf/cm$^2$ allows a low thermal conductivity to be easily achieved, and therefore is preferable. That is, it becomes easier to (i) increase a laser scattering intensity stably or (ii) increase an area of graphite stably, or it is possible to increase a ratio of an area taken up by graphite in a surface layer of an expanded molded product. Further, kneading for not shorter than 20 minutes allows a low thermal conductivity to be easily achieved, and therefore is preferable. That is, it becomes easier to (i) increase a laser scattering intensity stably or (ii) increase an area of graphite stably, or it is possible to increase a ratio of an area taken up by graphite in a surface layer of an expanded molded product.

In a method, in accordance with one embodiment of the present invention, for producing expandable resin particles, in a case where the expandable resin particles are prepared with use of a styrene resin, kneading with use of the kneading device including the twin-screw stirrer (i) is preferably carried out under a load of not less than 3.5 kgf/cm$^2$ for not shorter than 10 minutes and ended at a resin temperature of not less than 160° C., (ii) is more preferably carried out under a load of not less than 4 kgf/cm$^2$ for not shorter than 15 minutes and ended at a resin temperature of not less than 170° C., and (iii) is further more preferably carried out under a load of not less than 5 kgf/cm$^2$ for not shorter than 20 minutes. In order to achieve a viscosity that allows the graphite to be easily dispersed in the styrene resin, it is preferable that mixture be carried out until the resin temperature becomes not less than 170° C.

In a method, in accordance with one embodiment of the present invention, for producing expandable resin particles, kneading is carried out under a load with use of a kneading device including a twin-screw stirrer, so that a radiation suppressing property of graphite is enhanced and, accordingly, a thermal conductivity of a resin expanded molded product is reduced. This is because of (i) an increase in amount of scattered light, i.e., an increase in laser scattering intensity, (ii) an increase in area of graphite per unit solution concentration, or (iii) an increase in ratio of an area taken up by graphite in a surface layer of a molded product. Further, it is assumed that during kneading, detachment of graphite occurs so as to increase the number of particles of the graphite.

Meanwhile, examples of a polymerization method encompass: a suspension polymerization method which is used in general production of expandable styrene resin particles; and seed polymerization. In particular, it is preferable to employ a method in which (i) a resin and graphite are melt and kneaded with use of an extruder, (ii) a resultant melt and kneaded product is extruded through a die, which has small holes, and is cut by a cutter so as to obtain graphite-containing resin seed particles, (iii) the graphite-containing resin seed particles are subsequently suspended in water, and (iv) a resin monomer, an initiator, and, as necessary, other additives such as a bromine flame retardant and a nucleating agent are supplied so as to perform seed polymerization, wherein impregnation with a foaming agent is carried out before and/or during and/or after the polymerization.

Further, it is preferable that the above-described master batch containing graphite be used in the polymerization method. In a case where the polymerization method uses the master batch containing graphite, first, a resin and graphite can be kneaded with use of a kneading device including a twin-screw stirrer such as a Banbury mixer to prepare a master batch, and the master batch prepared and a new resin can be melt and kneaded with use of an extruder. The melt and kneaded product obtained can be subjected to steps similar to those of the above-described polymerization method to obtain expandable resin particles.

The polymerization method has an advantage that polymerization and impregnation with a foaming agent can be carried out with use of a device that is used in general production of expandable resin particles, so that a significant amount of investment for facility or change of facility is unnecessary. Meanwhile, the polymerization method involves suspension of resin seed particles in water, and accordingly produces a large amount of waste water and needs a drying process. The polymerization method accordingly has a great impact on the environment.

A resin for use in one embodiment is not particularly limited, but examples of the resin encompass: a styrene resin such as polystyrene (PS), a styrene-acrylonitrile copolymer (AS), a styrene-(meta)acrylic acid copolymer (heat-resistant PS), a styrene-(meta)acrylic acid ester copolymer, a styrene-butadiene copolymer (HIPS), a terpolymer of N-phenylmaleimide-styrene-maleic anhydride, and an alloy (IP) of any of these components and AS; a vinyl resin such as polymethylmetacrylate, a polyacrylonitrile resin, and a polyvinyl chloride resin; a polyolefin-based resin such as polypropylene, polyethylene, an ethylene-propylene copolymer, an ethylene-propylene-butene terpolymer, and a cycloolefin-based (co)polymer, and a rheologically controlled polyolefin-based resin in which a branched structure or a crosslinked structure is introduced in any of these components; a polyamide resin such as nylon 6, nylon 66, nylon 11, nylon 12, and MXD nylon; a polyester resin such as polyethylene terephthalate, polybutylene terephthalate, polyarylate, and polycarbonate, and an aliphatic polyester resin such as a polylactic acid; an engineering plastic such as a polyphenylene ether resin (PPE), a modified polyphenylene ether resin (modified PPE), a polyoxymethylene resin, a polyphenylene sulfide resin, a polyphenylene sulfide resin, an aromatic polyether resin, and a polyether ether ketone resin; and the like. These can be used alone or in combination of two or more thereof. In particular, a styrene resin is preferable for being inexpensive and allowing easy expansion molding.

A method, in accordance with one embodiment, for producing expandable resin particles is preferably arranged such that the expandable resin particles have a laser scattering intensity per unit solution concentration of the graphite of not less than 5 {%/(mg/ml)}/wt %, the laser scattering intensity being measured by subjecting a solution, in which the expandable resin particles are dispersed in a solvent, to laser diffractometry with use of a laser beam with a wavelength of 632.8 nm. The solvent is toluene in a case where the resin in the expandable resin particles is a styrene resin. In a case where the resin in the expandable resin particles is another resin, the solvent is not particularly limited provided that it is a solvent in which the resin can be dissolved.

Further, a method, in accordance with one embodiment, for producing expandable resin particles is preferably arranged such that the expandable resin particles have an area of the graphite per unit solution concentration of the graphite in 1 mm$^2$ of not less than 55 ({mm$^2$/mm$^2$}/(g/g)), the area of the graphite being measured by subjecting a solution, in which the expandable resin particles are dispersed in a solvent, to observation with use of an optical microscope. The solvent is toluene in a case where the resin in the expandable resin particles is a styrene resin. In a case where the resin in the expandable resin particles is another resin, the solvent is not particularly limited provided that it is a solvent in which the resin can be dissolved.

Further, in a case where the expandable resin particles are pre-expanded and are made into an expanded molded product having an expansion ratio of 40 times, a value obtained by dividing, by a content of the graphite, a ratio of an area taken up by the graphite in a surface layer of the expanded molded product is not less than 100.

The above-described methods in accordance with one embodiment of the present invention for producing expandable resin particles can each be used for preparing expandable styrene resin particles in accordance with any of the embodiments described above.

[3. Pre-Expanded Particles]

The following description will discuss, in detail, an arrangement and a physical property of pre-expanded particles in accordance with one embodiment of the present invention.

Pre-expanded particles in accordance with one embodiment of the present invention are preferably pre-expanded particles of a styrene resin, into which expandable styrene resin particles in accordance with any of the embodiments described above are pre-expanded.

Further, pre-expanded particles in accordance with one embodiment of the present invention are preferably pre-expanded particles into which expandable resin particles, which are prepared by the method in accordance with each embodiment described above for producing expandable resin particles, are pre-expanded.

Pre-expanded particles in accordance with one embodiment of the present invention have the same composition as that of the expandable styrene resin particles in accordance with one embodiment of the present invention and, through actual measurement conducted, exhibited a laser scattering intensity substantially the same as that of the expandable styrene resin particles in accordance with one embodiment of the present invention. Accordingly, a content of graphite is preferably 2.0 wt % to 8.0 wt %, more preferably 3.0 wt % to 7.0 wt/o, with respect to 100 wt % of the pre-expanded particles. A mean particle size of graphite is preferably 2.5 µm to 9 µm, more preferably 3 µm to 6 µm, and most preferably 4 µm to 6 µm.

With respect to the pre-expanded particles of the styrene resin, the above-described laser scattering intensity per unit solution concentration of graphite is found by a method identical to that described in (1-3. Laser scattering intensity), except that the term "expandable styrene resin particles" is replaced by "pre-expanded particles".

Further, pre-expanded particles in accordance with one embodiment of the present invention is preferably arranged such that an area of graphite per unit solution concentration in a solution in which the pre-expanded particles are dispersed in a solvent has a value that is in a range substantially the same as that of the above-described area of graphite per unit solution concentration in the solution in which expandable styrene resin particles are dispersed in a solvent.

[4. Method for Producing Pre-Expanded Resin Particles]

The following description will discuss, in detail, an arrangement and a feature of a method, in accordance with one embodiment of the present invention, for producing pre-expanded resin particles.

A method, in accordance with one embodiment of the present invention, for producing pre-expanded resin particles preferably includes a step of preparing pre-expanded resin particles of a styrene resin by pre-expanding expandable styrene resin particles in accordance with any of the embodiments described above.

Further, a method, in accordance with one embodiment of the present invention, for producing pre-expanded resin particles preferably includes a step of preparing pre-expanded resin particles by pre-expanding expandable styrene resin particles produced by the method, in accordance with each of the embodiments described above, for producing expandable resin particles.

A method, in one embodiment of the present invention, for producing pre-expanded resin particles of a styrene resin includes a conventionally well-known pre-expanding step (e.g., a step in which expandable resin particles are expanded by heated steam at an expansion ratio of 10 to 110 times into pre-expanded resin particles, and the pre-expanded resin particles are cured, as necessary, for a predetermined period and then are used for molding). The pre-expanded resin particles obtained are subjected to molding (e.g., in-mold molding) by steam with use of a conventionally well-known molding apparatus to prepare a styrene resin expanded molded product. Depending on a shape of a mold used, it is possible to obtain a molded product that is obtained by using a mold and has a complex shape, or a molded product having a shape of a block.

As used herein, the term "pre-expanded particles" and "pre-expanded resin particles" are synonymous.

Accordingly, a method, in accordance with one embodiment of the present invention, for producing pre-expanded resin particles may be used for preparing pre-expanded particles in accordance with one embodiment described above.

[5. Expanded Molded Product]

The following description will discuss, in detail, an arrangement and a physical property of expanded molded product in accordance with one embodiment of the present invention.

It is preferable that an expanded molded product in accordance with one embodiment of the present invention be a styrene resin expanded molded product into which pre-expanded particles of a styrene resin, which are obtained by pre-expanding expandable styrene resin particles in accordance with any of the embodiments described above, are molded.

Further, it is preferable that an expanded molded product in accordance with one embodiment of the present invention be an expanded molded product into which pre-expanded particles, which are obtained by pre-expanding expandable resin particles prepared by the method in accordance with each embodiment described above for producing expandable resin particles, are molded.

Further, it is preferable that an expanded molded product in accordance with one embodiment of the present invention be an expanded molded product into which pre-expanded particles in accordance with one embodiment described above are molded.

Further, it is preferable that an expanded molded product in accordance with one embodiment of the present invention be an expanded molded product into which pre-expanded resin particles, prepared by a method in accordance with one embodiment described above for producing pre-expanded resin particles, are molded.

An expanded molded product in accordance with one embodiment of the present invention has the same composition as that of the expandable styrene resin particles in accordance with one embodiment of the present invention and, through actual measurement conducted, exhibited a laser scattering intensity substantially the same as that of the expandable styrene resin particles in accordance with one embodiment of the present invention. Accordingly, a content of graphite is preferably 2.0 wt % to 8.0 wt %, more preferably 3.0 wt % to 7.0 wt %, with respect to 100 wt % of the styrene resin expanded molded product. A mean particle size of graphite is preferably 2.5 µm to 9 µm, more preferably 3 µm to 6 µm, and most preferably 4 µm to 6 µm.

Further, an expanded molded product in accordance with one embodiment of the present invention is preferably arranged such that an area of graphite per unit solution concentration in a solution in which the expanded molded product is dispersed in a solvent has a value that is in a range substantially the same as that of the above-described area of graphite per unit solution concentration in the solution in which expandable styrene resin particles are dispersed in a solvent.

For example, an expanded molded product in accordance with one embodiment of the present invention is a styrene resin expanded molded product containing graphite, a content of the graphite being 2.0 wt % to 8.0 wt % with respect to 100 wt % of the styrene resin expanded molded product, the graphite having a mean particle size of 2.5 m to 9 µm, in a case where a solution in which the styrene resin expanded molded product is dispersed in toluene is subjected to measurement by laser diffractometry with use of a laser beam with a wavelength of 632.8 nm, a laser scattering intensity per unit solution concentration of the graphite being not less than 5 {%/(mg/ml)}/wt %.

With respect to the expanded molded product, this laser scattering intensity per unit solution concentration of graphite is found by a method identical to that described in (1-3. Laser scattering intensity), except that the term "expandable styrene resin particles" is replaced by "expanded molded product".

It is preferable that a styrene resin expanded molded product in accordance with one embodiment of the present invention have a very low thermal conductivity even if the styrene resin expanded molded product has a high expansion ratio of 50 times ($cm^3/g$) or 70 times ($cm^3/g$). Further, it is more preferable that the styrene resin expanded molded product have a thermal conductivity B (W/m·K) (described later) of not more than 0.0310 (W/mK) in a case where the styrene resin expanded molded product has an expansion ratio of 50 times. Further, it is more preferable that the styrene resin expanded molded product have a thermal conductivity B (W/m·K) (described later) of not more than 0.0324 (W/mK) in a case where the styrene resin expanded molded product has an expansion ratio of 70 times. Specifically, it is more preferable that the styrene resin expanded molded product exhibit a very low thermal conductivity in a range of 0.0278 W/m·K to 0.0289 W/m·K at an expansion ratio of 50 times. Further, it is more preferable that the styrene resin expanded molded product have a very low thermal conductivity of 0.0300 (W/mK) to 0.0310 (W/mK) even after being stored for 30 days at a temperature of 50° C., at which a foaming agent is easily volatilized. That is, it is preferable that the styrene resin expanded molded product maintain a very low thermal conductivity, and accordingly an excellent heat insulating property, for a long period of time. Further, it is preferable that the styrene resin expanded molded product exhibit a very low thermal conductivity in a range of 0.0289 W/m·K to 0.0307 W/m·K at an expansion ratio of 70 times. Further, it is preferable that the styrene resin expanded molded product have a very low thermal conductivity of 0.0313 (W/mK) to 0.0324 (W/mK) even after being stored for 30 days at a temperature of 50° C., at which a foaming agent is easily volatilized. That is, it is preferable that the styrene resin expanded molded product maintain a very low thermal conductivity, and accordingly an excellent heat insulating property, for a long period of time.

An expanded molded product obtained from conventional expandable styrene resin particles has a problem that a foaming agent is lost over time so as to cause an increase in thermal conductivity and a resultant degradation in heat insulating property. Meanwhile, a styrene resin expanded molded product in accordance with one embodiment of the present invention is able to exhibit a lower thermal conductivity even after a foaming agent is sufficiently lost. This allows maintaining an excellent heat insulating property even after an elapse of a long period of time.

Furthermore, as an expansion ratio of a styrene resin expanded molded product increases, an amount of expandable styrene resin particles used as a raw material decreases. As such, according to one embodiment of the present invention, a styrene resin expanded molded product with a high expansion ratio can be produced at lower cost. Note that a conventional styrene resin expanded molded product has a disadvantage that in a case where the conventional styrene resin expanded molded product has an expansion ratio of not less than 40 times, a thermal conductivity is increased as the expansion ratio increases, so that a heat insulating property is degraded. However, expandable styrene resin particles in accordance with one embodiment of the present invention and/or a styrene resin expanded molded product obtained by a method of production in accordance with one embodiment of the present invention (described later) have/has a low thermal conductivity even at an expansion ratio of not less than 50 times. Accordingly, it is possible to provide a heat insulating material which has an excellent heat insulating property, is easy to handle due to being light-weight, and is less expensive.

A styrene resin expanded molded product in accordance with one embodiment of the present invention has a low thermal conductivity as well as a self-extinguishing property, and can be controlled to have an oxygen index of not less than 26. In this case, the styrene resin expanded molded can be particularly suitably used as a heat insulating material for building.

A styrene resin expanded molded product in accordance with one embodiment of the present invention has an expansion ratio of preferably not less than 50 times ($cm^3/g$), more preferably not less than 70 times ($cm^3/g$). In accordance with one embodiment of the present invention, a styrene resin expanded molded product can achieve a low thermal conductivity even in a case where the styrene resin expanded molded product has an expansion ratio of not less than 50 times. This enables a low production cost. Further, a styrene resin expanded molded product having an expansion ratio even higher than 50 times can exhibit a high level of heat insulating property. In particular, in a case of setting an expansion ratio to not less than 70 times, it is possible to obtain a styrene resin expanded molded product which not only enables a further reduction in production cost but also is advantageous in terms of a lightweight property.

Note that since a styrene resin expanded molded product in accordance with one embodiment of the present invention is produced with use of expandable styrene resin particles in accordance with one embodiment of the present invention described above, the styrene resin expanded molded product contains the same components (excluding a foaming agent etc.) as those contained in the resin particles, wherein a range of content of each component in the styrene resin expanded molded product is the same as that in the resin particles. A preferable embodiment, a more preferable embodiment, and a further more preferable embodiment of each component in the styrene resin expanded molded product are also the same as those in the resin particles. Further, a content of each component (excluding a foaming agent) in the expanded molded product tends to increase slightly as compared with a content of the each component in the resin particles, due to a loss of part of the foaming agent during pre-expansion and molding of the resin particles.

Graphite is preferably a graphite mixture containing scale-like graphite as a main component, and is more preferably scale-like graphite. A preferable range of a mean particle size etc. of graphite is also the same as the range described in the above-described section of expandable styrene resin particles in accordance with one embodiment of the present invention.

Further, a styrene resin expanded molded product in accordance with one embodiment of the present invention may contain, as an optional component, at least one selected from the group consisting of a flame retardant, a thermal stabilizer, a radical generator, and other additive(s), provided that the effects of one embodiment of the present invention are not impaired. The other additive(s) is/are at least one selected from the group consisting of, for example, a processing aid, a light-resistant stabilizer, an antistatic agent, a colorant such as a pigment, a nucleating agent, and a foaming aid. These optional components may be the same as those described above as examples in the section of expandable styrene resin particles. In particular, the flame retardant is preferably a bromine flame retardant, and the bromine flame retardant is added so that the styrene resin expanded molded product has a bromine content of preferably 0.8 wt % to 5.0 wt %. In a case where the molded product has a bromine content of not less than 0.8 wt %, an oxygen index of not less than 26 can be achieved, so that a flame retardancy and a self-extinguishing property are provided.

A styrene resin expanded molded product in accordance with one embodiment of the present invention is preferably arranged such that the styrene resin expanded molded product has a thermal conductivity A (W/m·K) and an expansion ratio C (cm³/g) which satisfy the following formula (1):

$$A \leq 0.0268 + 0.000045 \times C \qquad \text{Formula (1)}$$

where the thermal conductivity A is a thermal conductivity (W/m·K) as measured, at a central temperature of 23° C., in accordance with JIS A9511:2006R after the styrene resin expanded molded product is left to stand still at a temperature of 50° C. for 48 hours and further left to stand still at a temperature of 23° C. for 24 hours.

A styrene resin expanded molded product in accordance with one embodiment of the present invention is preferably arranged such that the styrene resin expanded molded product has a thermal conductivity B (W/m·K) and an expansion ratio C (cm³/g) which satisfy the following formula (2):

$$B \leq 0.0279 + 0.000065 \times C \qquad \text{Formula (2)}$$

where the thermal conductivity B is a thermal conductivity (W/m·K) as measured, at a central temperature of 23° C., in accordance with JIS A9511:2006R after the styrene resin expanded molded product is left to stand still at a temperature of 50° C. for 30 days and further left to stand still at a temperature of 23° C. for 24 hours.

A styrene resin expanded molded product has such a relationship that in a case where the styrene resin expanded molded product has an expansion ratio of not less than 40 times, a thermal conductivity is increased as the expansion ratio increases. This is because an increase in expansion ratio causes a decrease in thickness of a cell membrane constituting the styrene resin expanded molded product, so that thermal conduction by radiation is increased. Accordingly, at a certain expansion ratio, a styrene resin expanded molded product having a lower thermal conductivity has a better heat insulating property.

Note that an expansion ratio is herein expressed using a unit "times" or a unit "cm³/g", which are synonymous with each other.

A styrene resin expanded molded product in accordance with one embodiment of the present invention has an average cell diameter of preferably 70 μm to 250 μm, more preferably 90 μm to 200 μm, further more preferably 100 μm to 180 μm. In a case where the average cell diameter is in a range as described above, the styrene resin expanded molded product has a better heat insulating property. An expanded molded product having an average cell diameter of not less than 70 μm has an increased closed cell ratio, and an expanded molded product having an average cell diameter of not more than 250 μm has a decreased thermal conductivity. An average cell diameter is adjustable, for example, by selecting an amount of a nucleating agent as appropriate.

[6. Use of Expanded Molded Product]

An expanded molded product in accordance with one embodiment of the present invention can be put to various uses such as, for example, a heat insulating material for building, a box for agricultural or fishery products, a heat insulating material for a bathroom, and a heat insulating material for a hot-water tank.

(Heat Insulating Material for Building)

A heat insulating material for houses is used for 10 years or more, and accordingly faces an important issue of how to maintain a heat insulating property after an elapse of a long period of time. As compared with a conventional expanded molded product, an expanded molded product obtained in one embodiment of the present invention is able to have a lower thermal conductivity after an elapse of a long period of time, and therefore can be suitably used as a heat insulating material for building, for example, for a floor, a wall, or a roof.

(Box for Agricultural or Fishery Products)

As compared with a conventional expanded molded product, an expanded molded product obtained in one embodiment of the present invention is able to have a lower thermal conductivity after an elapse of a long period of time, and therefore can be suitably used as a box for transporting fishery products such as fish, and a box for transporting agricultural products such as vegetables. In a case where a box for agricultural or fishery products has an excellent heat insulating property, an amount of ice used in transportation of fresh fish can be reduced, and freshness of vegetables or the like can be maintained well even in summer.

(Heat Insulating Material for Bathroom)

In recent years, in order to prevent a temperature drop of bath water, a heat insulating material is often used in a wall, a ceiling, a floor, or even a bathtub of the bathroom. As compared with a conventional expanded molded product, an expanded molded product obtained in one embodiment of the present invention is able to have a lower thermal conductivity after an elapse of a long period of time, and therefore can be suitably used as a heat insulating material for a bathroom.

(Heat Insulating Material for a Hot-Water Tank)

In a hot-water tank of an EcoCute (registered trademark) or the like, a heat insulating material is used in order to prevent a temperature drop of hot water. As compared with a conventional expanded molded product, an expanded molded product obtained in one embodiment of the present invention is able to have a lower thermal conductivity after an elapse of a long period of time, and therefore can be suitably used as a heat insulating material for a hot-water tank.

[7. Method for Producing Expanded Molded Product]

The following description will discuss, in detail, an arrangement and a feature of a method, in accordance with one embodiment of the present invention, for producing an expanded molded product.

A method, in accordance with one embodiment of the present invention, for producing an expanded molded product preferably includes a step of molding pre-expanded resin particles of a styrene resin, which pre-expanded resin particles are obtained by pre-expanding expandable styrene resin particles in accordance with any of the embodiments described above.

Further, a method, in accordance with one embodiment of the present invention, for producing an expanded molded product preferably includes a step of molding pre-expanded resin particles obtained by pre-expanding expandable resin particles prepared by the method in accordance with each embodiment described above for producing expandable resin particles.

Further, a method, in accordance with one embodiment of the present invention, for producing an expanded molded product preferably includes a step of molding pre-expanded particles in accordance with one embodiment described above.

Further, a method, in accordance with one embodiment of the present invention, for producing an expanded molded product preferably includes a step of molding pre-expanded resin particles prepared by a method in accordance with one embodiment for producing pre-expanded resin particles.

Further, a method, in accordance with one embodiment of the present invention, for producing an expanded molded product may be used for preparing an expanded molded product in accordance with one embodiment described above.

An expanded molded product obtained by a method in accordance with one embodiment of the present invention for producing an expanded molded product preferably includes the arrangements and physical properties described in "5. Expanded molded product", and more preferably includes the arrangements and physical properties of a styrene resin expanded molded product in accordance with one embodiment of the present invention.

A method, in accordance with one embodiment of the present invention, for producing an expanded molded product includes a predetermined pre-expanding step and a molding step. It is preferable that (i) the method include a pre-expanding step of introducing steam to expandable resin particles, which have been put in a can of a pre-expanding apparatus, so as to obtain pre-expanded particles and a molding step of subjecting the pre-expanded particles to in-mold molding and (ii) a duration of the introduction of steam in the pre-expanding step be 50 seconds to 500 seconds.

(Pre-Expanding Step)

The pre-expanding step can be conducted, with use of a pre-expanding apparatus, in a similar manner to pre-expansion of conventional expandable resin particles.

(Molding Step)

In the molding step, an expanded molded product can be obtained in a similar manner to a conventional expansion molding method, except that pre-expanded particles obtained in the pre-expanding step described above are used.

Further, in one embodiment of the present invention, it is preferable that a closed cell ratio of pre-expanded particles and a closed cell ratio of an expanded molded product be each adjusted to 95% to 100%. In a case where pre-expanded particles have a closed cell ratio of not less than 95%, a higher expansion ratio tends to be easily achieved and an expanded molded product obtained with use of the pre-expanded particles tends to have an enhanced surface appearance. In a case where an expanded molded product has a closed cell ratio of not less than 95%, the expanded molded product tends to have a reduced thermal conductivity. A closed cell ratio is adjustable, for example, by introducing a mixture of steam and air into a can or a mold while selecting a ratio of the steam in the mixture as appropriate.

In the invention of Patent Literature 1 described above, an expanded molded product does not contain graphite which suppresses heat propagation. As such, although a thermal conductivity achieved by the expanded molded product of the invention of Patent Literature 1 is lower than those of expanded molded products before Patent Literature 1, the invention of Patent Literature 1 does not accomplish a heat insulating property at a level that meets demands in the market. Meanwhile, an expanded molded product in each of the inventions of Patent Literatures 2 through 11 contains graphite, so that a reduction in thermal conductivity and an improvement in heat insulating property are achieved as compared with a conventional expanded molded product. However, in the market, there is a demand for a significant reduction of costs for an expanded molded product as well as a demand for an expanded molded product having both a high expansion ratio and a low thermal conductivity. In particular, there is a demand for an expanded molded product having a low thermal conductivity even in a case where butane, pentane, or the like is replaced by air after an elapse of a long period of time. The inventions of Patent Literature 2 through 11 have been unable to satisfy these demands.

Further, in a conventional pre-expanding method described above, in a case where expandable resin particles containing graphite, which has a radiative heat transfer suppression effect, are used for the purpose of further reducing a thermal conductivity of an expanded molded product, a hole is easily formed in a cell membrane in pre-expanded particles during per-expansion, mainly because of the presence of the graphite. This makes it extremely difficult to obtain pre-expanded particles having an expansion ratio of not less than 65 $cm^3/g$. Furthermore, there is a problem that even in a case where pre-expanded particles having an expansion ratio of not less than 65 $cm^3/g$ are obtained by adjusting expansion conditions, an expanded molded product, into which the pre-expanded particles are expanded and molded, has an inferior surface appearance. Further, a decrease in expansion ratio also impairs a lightweight property of an expanded molded product.

As a technique for obtaining pre-expanded particles having a high expansion ratio, a two-stage expansion method is known. The two-stage expansion method is a method in which (i) expandable resin particles are subjected to a first-stage pre-expansion so as to obtain expanded particles having an expansion ratio increased to a certain extent, (ii) the expanded particles are cured so as to introduce air inside the expanded particles, and (iii) then the expanded particles are subjected to a second-stage pre-expansion so as to obtain pre-expanded particles having a further increased expansion ratio. The two-stage expansion method encompasses: a method in which, after completion of the first-stage pre-expansion, the expanded particles obtained are cured in a can of a pre-expanding apparatus; and a method in which, after completion of the first-stage pre-expansion, the expanded particles obtained are taken out of the pre-expanding apparatus, cured, and then introduced back into the pre-expanding apparatus.

With use of the two-stage expansion method, pre-expanded particles having an expansion ratio of not less than 65 $cm^3/g$ can be easily obtained, even in a case where expandable resin particles consisting of a resin composition containing graphite is used. However, the two-stage pre-expansion (heat expansion) causes a significant increase in number of cells in pre-expanded particles which cells have a cell membrane with a hole therein. This results in problems that (i) an expanded molded product, into which the pre-expanded particles are molded, exhibits a relatively high thermal conductivity due to, for example, a decrease in closed cell ratio, (ii) a degradation of surface appearance, and (iii) a degradation of mechanical properties due to poor fusion between the pre-expanded particles inside the expanded molded product.

As described above, in a case where an expanded molded product is produced by a conventional pre-expanding method with use of expandable resin particles consisting of a resin containing graphite at a relatively high content of 3 wt % to 8 wt %, it is extremely difficult to obtain an expanded molded product which (i) has both of: an excellent heat insulating property based on a low thermal conductivity, a closed cell ratio, and the like; and a splendid light-weight property based on a high expansion ratio (in particular, an expansion ratio of not less than 65 cm$^3$/g) and the like, (ii) maintains the low thermal conductivity for a long period of time, and further (iii) has a good surface appearance. Furthermore, such an expanded molded product has not appeared in the market at present.

Accordingly, an object of the present invention is to provide expandable styrene resin particles and pre-expanded particles of a styrene resin, each enabling production of a styrene resin expanded molded product having a high expansion ratio and a low thermal conductivity, i.e., having an excellent heat insulating property, (ii) a styrene resin expanded molded product, and (iii) a method for producing expandable resin particles.

By including (i) arrangements included in the embodiments described above and (ii) arrangements included in (a) embodiments altered in various ways within the scope of the appended Claims and (b) any embodiment derived from an appropriate combination of the technical means disclosed in the embodiments, one embodiment of the present invention brings about the following effects. That is, one embodiment of the present invention has (i) an effect that a heat insulating property equivalent to that of a conventional styrene resin expanded molded product having a low expansion ratio can be achieved as well as an extremely high expansion ratio, so that an amount of expandable styrene resin particles used as a raw material can be significantly reduced so as to enable production at low cost, (ii) an effect that the high expansion ratio allows providing a styrene resin expanded molded product that is light-weight, and (iii) an effect that a styrene resin expanded molded product having a low thermal conductivity even after an elapse of a long period of time can be provided.

One embodiment of the present invention may have the following arrangements.

[1] Expandable styrene resin particles containing graphite, a content of the graphite being 2.0 wt % to 8.0 wt % with respect to 100 wt % of the expandable styrene resin particles, the graphite having a mean particle size of 2.5 μm to 9 μm, in a case where a solution in which the expandable styrene resin particles are dispersed in toluene is subjected to measurement by laser diffractometry with use of a laser beam with a wavelength of 632.8 nm, a laser scattering intensity per unit solution concentration of the graphite being not less than 5 {%/(mg/ml)}/wt %.

[2] The expandable styrene resin particles as set forth in [1], wherein the laser scattering intensity per unit solution concentration of the graphite is not less than 6 {%/(mg/ml)}/wt %.

[3] The expandable styrene resin particles as set forth in [1] or [2], wherein in a case where the laser scattering intensity per unit solution concentration of the graphite is expressed as X ({%/(mg/ml)}/wt % and the mean particle size of the graphite is expressed as Y (μm), X+Y>10.

[4] Expandable styrene resin particles containing graphite, a content of the graphite being 2.0 wt % to 8.0 wt % with respect to 100 wt % of the expandable styrene resin particles, the graphite having a mean particle size of 2.5 μm to 9 μm, in a case where a solution in which the expandable styrene resin particles are dispersed in toluene is subjected to observation with use of an optical microscope, an area of the graphite per unit solution concentration of the graphite in 1 mm$^2$ being not less than 55 ({mm$^2$/mm$^2$}/{g/g}.

[5] The expandable styrene resin particles as set forth in [4], wherein the area of the graphite per unit solution concentration of the graphite is not less than 60 ({mm$^2$/mm$^2$}/{g/g}).

[6] Expandable styrene resin particles containing graphite, a content of the graphite being 2.0 wt % to 8.0 wt % with respect to 100 wt % of the expandable styrene resin particles, the graphite having a mean particle size of 2.5 μm to 9 μm, further in a case where the expandable styrene resin particles are pre-expanded and are made into an expanded molded product having an expansion ratio of 40 times, a value obtained by dividing, by the content of the graphite, a ratio of an area taken up by the graphite in a surface layer of the expanded molded product being not less than 100.

[7] The expandable styrene resin particles as set forth in [6], wherein the value obtained by dividing, by the content of the graphite, the ratio of the area taken up by the graphite in the surface layer of the expanded molded product is not less than 110.

[8] The expandable styrene resin particles as set forth in any one of [1] through [7], wherein the content of the graphite is 3.0 wt % to 7.0 wt % with respect to 100 wt % of the expandable styrene resin particles.

[9] The expandable styrene resin particles as set forth in any one of [1] through [8], wherein the graphite has a mean particle size of 3 μm to 6 μm.

[10] The expandable styrene resin particles as set forth in any one of [1] through [9], wherein in a case where the expandable styrene resin particles are pre-expanded and are made into an expanded molded product having an expansion ratio of 50 times, the expanded molded product has an average cell diameter of 70 μm to 250 μm.

[11] The expandable styrene resin particles as set forth in any one of [1] through [10], wherein in a case where the expandable styrene resin particles are made into an expanded molded product having an expansion ratio of 50 times, the expanded molded product has a thermal conductivity of not more than 0.0310 (W/mK) as measured, at a central temperature of 23° C., in accordance with JIS A9511:2006R after the expanded molded product is left to stand still at a temperature of 50° C. for 30 days and further left to stand still at a temperature of 23° C. for 24 hours.

[12] The expandable styrene resin particles as set forth in any one of [1] through [11], wherein in a case where the expandable styrene resin particles are made into an expanded molded product having an expansion ratio of 70 times, the expanded molded product has a thermal conductivity of not more than 0.0324 (W/mK) as measured, at a central temperature of 23° C., in accordance with JIS A9511:2006R after the expanded molded product is left to stand still at a temperature of 50° C. for 30 days and further left to stand still at a temperature of 23° C. for 24 hours.

[13] Pre-expanded particles of a styrene resin, into which expandable styrene resin particles recited in any one of [1] through [12] are pre-expanded.

[14] A styrene resin expanded molded product, into which pre-expanded particles, recited in [13], of a styrene resin are molded.

[15] A styrene resin expanded molded product containing graphite, a content of the graphite being 2.0 wt % to 8.0 wt % with respect to 100 wt % of the styrene resin expanded molded product, the graphite having a mean particle size of 2.5 μm to 9 μm, in a case where a solution in which the styrene resin expanded molded product is dispersed in toluene is subjected to measurement by laser diffractometry with use of a laser beam with a wavelength of 632.8 nm, a laser scattering intensity per unit solution concentration of the graphite being not less than 5 {%/(mg/ml)}/wt %.

[16] The styrene resin expanded molded product as set forth in [14] or [15], wherein the styrene resin expanded molded product has an expansion ratio of not less than 50 times ($cm^3/g$).

[17] The styrene resin expanded molded product as set forth in any one of [14] through [16], wherein the styrene resin expanded molded product has a thermal conductivity A (W/m·K) and an expansion ratio C ($cm^3/g$) which satisfy the following formula (1):

$$A \leq 0.0268 + 0.000045 \times C \qquad \text{Formula (1)}$$

where the thermal conductivity A is a thermal conductivity (W/m·K) as measured, at a central temperature of 23° C., in accordance with JIS A9511:2006R after the styrene resin expanded molded product is left to stand still at a temperature of 50° C. for 24 hours and further left to stand still at a temperature of 23° C. for 48 hours.

[18] The styrene resin expanded molded product as set forth in any one of [14] through [17], wherein the styrene resin expanded molded product has a thermal conductivity B (W/m·K) and an expansion ratio C ($cm^3/g$) which satisfy the following formula (2):

$$B \leq 0.0279 + 0.000065 \times C \qquad \text{Formula (2)}$$

where the thermal conductivity B is a thermal conductivity (W/m·K) as measured, at a central temperature of 23° C., in accordance with JIS A9511:2006R after the styrene resin expanded molded product is left to stand still at a temperature of 50° C. for 30 days and further left to stand still at a temperature of 23° C. for 24 hours.

[19] The styrene resin expanded molded product as set forth in any one of [14] through [18], wherein the styrene resin expanded molded product has an average cell diameter of 70 μm to 250 μm.

[20] A method for producing expandable resin particles containing graphite, a content of the graphite being 2.0 wt % to 8.0 wt % with respect to 100 wt % of the expandable resin particles, the graphite having a mean particle size of 2.5 μm to 9 μm, the method including: a stirring step of kneading, with use of a kneading device including a twin-screw stirrer, the graphite and a resin under a load of not less than 3.5 $kgf/cm^2$, at a resin temperature of not less than Tg+50° C. (Tg is a glass transition temperature of the resin), and for a duration of kneading of not less than 10 minutes to prepare a master batch; and an extruding step of melting, kneading, and extruding a mixture with use of an extruder, the mixture containing the master batch and a new resin.

A method for producing expandable resin particles containing graphite, the method using a master batch containing a resin and the graphite which satisfy the following formula (3):

$$b > 1.4a \qquad \text{Formula (3)}$$

where:

a is a laser scattering intensity per unit solution concentration of the graphite [{%/(mg/ml)}/wt %] as measured, prior to preparation of the master batch, by subjecting a solution, in which the graphite before being kneaded with the resin is dispersed in a solvent, to measurement by laser diffractometry with use of a laser beam with a wavelength of 632.8 nm; and b is a laser scattering intensity per unit solution concentration of the graphite [{%/(mg/ml)}/wt %] as measured, after the preparation of the master batch, by subjecting a solution, in which the master batch is dispersed in a solvent, to measurement by laser diffractometry with use of a laser beam with a wavelength of 632.8 nm.

[22] The method as set forth in [21], wherein the method includes: a stirring step of kneading the resin and the graphite with use of a kneading device including a twin-screw stirrer to prepare the master batch; and an extruding step of melting, kneading, and extruding a mixture with use of an extruder, the mixture containing the master batch and a new resin.

[23] The method as set forth in any one of [20] through [22], wherein the expandable resin particles have a laser scattering intensity per unit solution concentration of the graphite of not less than 5 {%/(mg/ml)}/wt %, the laser scattering intensity being measured by subjecting a solution, in which the expandable resin particles are dispersed in a solvent, to laser diffractometry with use of a laser beam with a wavelength of 632.8 nm.

[24] The method as set forth in any one of [20] through [22], wherein the expandable resin particles have an area of the graphite per unit solution concentration of the graphite in 1 $mm^2$ of not less than 55 ({$mm^2/mm^2$}/{g/g}), the area of the graphite being measured by subjecting a solution, in which the expandable resin particles are dispersed in a solvent, to observation with use of an optical microscope.

[25] The method as set forth in any one of [20] through [22], wherein in a case where the expandable resin particles are pre-expanded and are made into an expanded molded product having an expansion ratio of 40 times, a value obtained by dividing, by a/the content of the graphite, a ratio of an area taken up by the graphite in a surface layer of the expanded molded product is not less than 100.

[26] The method as set forth in [20] or [22], wherein the extruding step is a step in which the master batch prepared, the new resin, and a foaming agent are melt and kneaded with use of the extruder and are extruded through a small hole, the method further including a step of cutting a resin extruded in the extruding step while cooling the resin so as to solidify the resin to prepare the expandable resin particles.

[27] The method as set forth in [20] or [22], wherein the extruding step is a step in which the master batch prepared and the new resin are melt and kneaded with use of the extruder and are extruded through a small hole, the method further including: a step of cutting a resin extruded in the extruding step to obtain resin particles; and a step of suspending the resin particles in water while causing a foaming agent to be contained in the resin particles to obtain the expandable resin particles.

[28] The method as set forth in any one of [20] through [27], wherein the expandable resin particles are expandable styrene resin particles.

[29] The method as set forth in [20] or [22], wherein a condition of kneading in the stirring step is a load of not less than 3.5 kgf/cm$^2$, a resin temperature of not lower than 160° C., and a duration of kneading of not less than 10 minutes.
[30] A method for producing pre-expanded resin particles, the method including a step of preparing the pre-expanded resin particles by pre-expanding expandable resin particles prepared by a method recited in any one of [20] through [29].
[31] A method for producing an expanded molded product, the method including a step of molding pre-expanded resin particles prepared by a method recited in [30].

One embodiment of the present invention is not limited to the above-described embodiments but allows various modifications within the scope of the claims. Any embodiment derived from an appropriate combination of the technical means disclosed in the different embodiments will also be included in the technical scope of one embodiment of the present invention.

EXAMPLES

The following description will discuss one embodiment of the present invention in detail on the basis of Examples and Comparative Examples. The present invention is, however, not limited by the Examples and the Comparative Examples.

Note that the following measurement methods and evaluation methods were employed in the Examples and the Comparative Examples below.

(Measurement of Thermal Conductivity a of Styrene Resin Expanded Molded Product)

It is generally known that a value of thermal conductivity increases as an average temperature of measurement at which the thermal conductivity is measured increases. In order to compare heat insulating properties, it is necessary to determine an average temperature of measurement. Herein, a temperature of 23° C., which is defined under JIS A9511: 2006R (a standard for expanded plastic heat retaining materials), is used as a reference.

In the Examples and Comparative Examples below, a thermal conductivity A was measured in the following manner. A sample for thermal conductivity measurement was cut out from a styrene resin expanded molded product, and was left to stand still at a temperature of 50° C. for 48 hours and further left to stand still at a temperature of 23° C. for 24 hours. Then, the thermal conductivity A was measured.

More specifically, a sample having a size of length 300 mm×width 300 mm×25 mm was cut out from a styrene resin expanded molded product. As for a thickness direction, a thickness of the styrene resin expanded molded product itself, 25 mm, was utilized. Accordingly, two surfaces of the sample, each having a size of length 300 mm×width 300 mm, remained original surfaces as obtained when the styrene resin expanded molded product had been molded. Such an original surface as obtained at a time of molding is generally called "surface skin" and is herein defined as "surface layer." The sample was left to stand still at a temperature of 50° C. for 48 hours and further left to stand still at a temperature of 23° C. for 24 hours. Subsequently, a thermal conductivity A was measured by the heat flow meter method in accordance with JIS A1412-2:1999 with use of a thermal conductivity measuring device (produced by EKO Instrument; HC-074), at an average temperature of 23° C. and with a temperature difference of 20° C.

(Measurement of Thermal Conductivity B of Styrene Resin Expanded Molded Product after Annealing)

In order to evaluate a thermal conductivity B in a case in which a foaming agent is replaced by air after an elapse of a long period of time, a sample for thermal conductivity measurement was cut out from a styrene resin expanded molded product, and was left to stand still at a temperature of 50° C. for 30 days and further left to stand still at a temperature of 23° C. for 24 hours. Then, the thermal conductivity B was measured.

As a result of drying (annealing) performed for 30 days at 50° C., a content of a hydrocarbon foaming agent, such as butane or pentane, contained in the styrene resin expanded molded product had become not more than 0.5%, and thus had little influence on thermal conductivity. Accordingly, evaluation of a thermal conductivity B in a case in which the styrene resin expanded molded product has been used at room temperature for a long period of time can be made almost accurately.

More specifically, a sample having a size of length 300 mm×width 300 mm×thickness 25 mm was cut out from a styrene resin expanded molded product in a similar manner to the measurement of a thermal conductivity A. The sample was left to stand still at a temperature of 50° C. for 30 days and further left to stand still at a temperature of 23° C. for 24 hours. Subsequently, a thermal conductivity B was measured by the heat flow meter method in accordance with JIS A1412-2:1999 with use of a thermal conductivity measuring device (produced by EKO Instrument; HC-074), at an average temperature of 23° C. and with a temperature difference of 20° C.

(Measurement of Graphite Content)

To be used as a sample, approximately 10 mg of expandable styrene resin particles or pre-expanded particles of a styrene resin were collected or an approximately 10 mg test piece was cut out from a styrene resin expanded molded product. The sample was subjected to the following treatments I through III in succession, with use of a thermogravimetry device (produced by SII NanoTechnology Inc.; TG/DTA 220U) equipped with a thermal analysis system: EXSTAR 6000. An amount of decrease in weight in III was expressed, as a weight of graphite, in percentage with respect to a weight of the test piece.

I. In a nitrogen stream of 200 mL/min, a temperature of the sample is raised from 40° C. to 600° C. at a rate of 20° C./min, and then the temperature 600° C. is maintained for 10 minutes.

II. In a nitrogen stream of 200 mL/min, the temperature of the sample is lowered from 600° C. to 400° C. at a rate of 10° C./min, and then the temperature 400° C. is maintained for 5 minutes.

III. In an air stream of 200 mL/min, the temperature of the sample is raised from 400° C. to 800° C. at a rate of 20° C./min, and then the temperature 800° C. is maintained for 15 minutes.

(Measurement of Mean Particle Size D50 (μm) of Graphite and Laser Scattering Intensity (%))

(1) Conditions of Adjustment of Sample Solution (a) In a case where expandable styrene resin particles, pre-expanded particles, or an expanded molded product is to be subjected to the measurement, 500 mg of a sample is dissolved and dispersed in 20 mL of 0.1% (w/w) Span 80 toluene solution.

(b) In a case where graphite before being kneaded (i.e., graphite itself as a raw material) is to be subjected to the measurement, 20 mg of the graphite and 480 mg of a styrene resin (A) are dissolved and dispersed in 20 mL of 0.1% (w/w) Span 80 toluene solution.

(c) In a case where a graphite master batch is to be subjected to the measurement, 40 mg of the graphite master batch is dissolved and dispersed in 20 mL of 0.1% (w/w) Span 80 toluene solution.

In (a) through (c), dispersion means a state in which a resin is dissolved and graphite is dispersed.

Subsequently, the sample solution above is subjected to ultrasonic irradiation with use of an ultrasonic cleaner so as to reduce aggregation of graphite.

(2) Conditions of Ultrasonic Irradiation

Device used: ultrasonic cleaner produced by AS ONE Corporation; model number: USM Oscillation frequency: 42 kHz Duration of irradiation: 10 minutes Temperature: room temperature (3) Conditions of Measurement of Particle Size Measuring device: laser diffraction particle size distribution measuring device Mastersizer 3000, produced by Malvern Light source: a 632.8 nm red He—Ne laser and a 470 nm blue LED Dispersant unit: wet dispersant unit Hydro MV In accordance with the following settings, analysis was conducted in which measurement and analysis were performed by laser diffractometry based on Mie theory in accordance with ISO13320:2009, JIS Z8825-1 so as to obtain a volume distribution and calculate a D50 particle size of graphite in the sample.

Particle type: nonspherical

Refractive index of graphite: 2.42

Absorptance of graphite: 1.0

Dispersion medium: 0.1% (w/w) Span 80 toluene solution

Refractive index of dispersion medium: 1.49

Rate of stirring in dispersant unit: 2500 rpm

Analysis model: generally used model; single mode is maintained

Temperature of measurement: room temperature (4) Procedure of Measurement 120 mL of 0.1% (w/w) Span 80 toluene solution was introduced into a dispersant unit, was stirred at 2500 rpm, and was stabilized. In a state where a measurement cell contained no sample solution and contained only a dispersion medium, irradiation with a 632.8 nm red He—Ne laser beam was performed. At this time, an intensity of light was measured by a central detector as an intensity Lb of transmitted light. Subsequently, 2 mL of a sample solution, which had been subjected to an ultrasonic treatment, was collected and added to the dispersant unit. One minute after the addition of the sample solution, irradiation with a 632.8 nm red He—Ne laser beam was performed. At this time, an intensity of light was measured by the central detector as an intensity Ls of transmitted light. Simultaneously, a particle size (D50) was also measured. From Ls and Lb thus obtained, a laser scattering intensity Ob of the sample solution was calculated in accordance with the following formula.

$$Ob = (1 - Ls/Lb) \times 100(\%)$$

The central detector is a detection section which is located in front of an output of the laser beams so as to face the output. Light detected by the central detector represents transmitted light that was not used for scattering. A laser scattering intensity represents an amount of a laser beam that is lost when a laser of an analysis device is scattered by a sample.

(5) Calculation of Laser Scattering Intensity Per Unit Solution Concentration of Expandable Styrene Resin Particles, Pre-Expanded Particles, or Expanded Molded Product In accordance with the following formula, a laser scattering intensity per unit solution concentration of the expandable styrene resin particles, the pre-expanded particles, or the expanded molded product was calculated.

Laser scattering intensity per unit solution concentration of expandable styrene resin particles, pre-expanded particles, or expanded molded product (%/(mg/ml))=laser scattering intensity $(Ob)$/{weight of sample (500 mg)/amount of toluene (20 mL)×amount of sample introduced (2 mL)/total amount of toluene in dispersant unit (120 mL+2 mL)}

The laser scattering intensity per unit solution concentration means a value obtained by dividing a measured laser scattering intensity by a concentration of a sample in toluene. Since this measuring device was a device that required measurement to be carried out with use of a solution, the concentration of a sample in the toluene solution was made constant so as to obtain measured values at a constant amount of the sample.

(6) Calculation of Laser Scattering Intensity Per Unit Solution Concentration of Graphite in Expandable Styrene Resin Particles In accordance with the following formula, a laser scattering intensity per unit solution concentration of graphite contained in the expandable styrene resin particles was calculated.

Laser scattering intensity per unit solution concentration of graphite in expandable styrene resin particles {%/(mg/ml)}/wt %=laser scattering intensity per unit solution concentration of expandable styrene resin particles {%/(mg/ml)}/graphite content of expandable styrene resin particles (wt %)

It is an essence of one embodiment of the present invention that even with use of graphite having the same weight, an improvement in heat insulating property can be achieved by adjusting a state of the graphite contained in the expandable styrene resin particles, i.e., by adjusting a concentration at which the graphite is dispersed. The use of the above-described laser scattering intensity per unit solution concentration of graphite allows expressing one embodiment of the present invention.

(7) Calculation of Laser Scattering Intensity Per Unit Solution Concentration of Graphite in Pre-Expanded Particles In accordance with the following formula, a laser scattering intensity per unit solution concentration of graphite contained in the pre-expanded particles was calculated.

Laser scattering intensity per unit solution concentration of graphite in pre-expanded particles {%/(mg/ml)}/wt %=laser scattering intensity per unit solution concentration of pre-expanded particles (%/(mg/ml))/graphite content of pre-expanded particles (wt %)

(8) Calculation of Laser Scattering Intensity Per Unit Solution Concentration of Graphite in Expanded Molded Product In accordance with the following formula, a laser scattering intensity per unit solution concentration of graphite contained in the expanded molded product was calculated.

Laser scattering intensity per unit solution concentration of graphite in expanded molded product {%/(mg/ml)}/wt %=laser scattering intensity per unit solution concentration of expanded molded product (%/(mg/ml))/graphite content of expanded molded product (wt %)

(9) Calculation of Laser Scattering Intensity Per Unit Solution Concentration of Mixture of Graphite Before being Kneaded and Styrene Resin In accordance with the following formula, a laser scattering intensity per unit solution concentration of a mixture of graphite before being kneaded and a styrene resin was calculated.

Laser scattering intensity per unit solution concentration of mixture of graphite before being kneaded and styrene resin {%/(mg/ml)}=laser scattering intensity (Ob)/[{weight of graphite (20 mg)+styrene resin (480 mg)}/amount of toluene (20 mL)×amount of sample introduced (2 mL)/total amount of toluene in dispersant unit (120 mL+2 mL)]

(10) Laser Scattering Intensity Per Unit Solution Concentration of Graphite Before being Kneaded In accordance with the following formula, a laser scattering intensity per unit solution concentration of graphite before being kneaded (i.e., graphite as a raw material) was calculated.

Laser scattering intensity per unit solution concentration of graphite before being kneaded {%/(mg/ml)}/wt %=laser scattering intensity per unit solution concentration of mixture of graphite before being kneaded and styrene resin (%/(mg/ml))/graphite content in mixture of graphite before being kneaded and styrene resin (20/500×100=4 wt %)

(11) Calculation of Laser Scattering Intensity Per Unit Solution Concentration of Graphite Master Batch In accordance with the following formula, a laser scattering intensity per unit solution concentration of the graphite master batch was calculated.

Laser scattering intensity per unit solution concentration of graphite master batch (%/(mg/ml))=laser scattering intensity (Ob)/{weight of master batch (40 mg)/amount of toluene (20 mL)× amount of sample introduced (2 mL)/total amount of toluene in dispersant unit (120 mL+2 mL)}

(12) Calculation of Laser Scattering Intensity Per Unit Solution Concentration of Graphite in Graphite Master Batch In accordance with the following formula, a laser scattering intensity per unit solution concentration of graphite in the graphite master batch was calculated.

Laser scattering intensity per unit solution concentration of graphite in graphite master batch {%/(mg/ml)}/wt %=laser scattering intensity per unit solution concentration of graphite master batch (%/(mg/ml))/graphite content of graphite master batch (wt %)

(Measurement of Area of Graphite Per Unit Solution Concentration)

(1) Conditions of Adjustment of Sample Solution 0.03 g of a sample of the expandable styrene resin particles, the pre-expanded particles, or the expanded molded product is dissolved and dispersed in 10 g of 1.0% (w/w) Span 80 toluene solution. Note here that dispersion means a state in which a resin is dissolved and graphite is dispersed.

Subsequently, the sample solution above is subjected to ultrasonic irradiation with use of an ultrasonic cleaner so as to reduce aggregation of graphite.

(2) Conditions of Ultrasonic Irradiation

Device used: ultrasonic cleaner produced by AS ONE Corporation; model number: USM Oscillation frequency: 42 kHz Duration of irradiation: 10 minutes Temperature: room temperature (3) Conditions of Observation Device Device: DIGITAL MICROSCOPE VHX-5000, produced by KEYENCE Lens used: VH-Z100R; aperture ring fully opened Illumination: side illumination is employed with a ring illumination base unit OP-72400 and a variable illumination attachment OP-72404 which are connected.

Magnification for observation: 300

(4) Procedure of Measurement

A stainless steel spacer with an outer diameter of 9 mm, an inner diameter of 6 mm, and a thickness of 10 μm is placed on a sheet of cover glass (18×18 mm). Then, two or more droplets of the sample solution, which has been subjected to an ultrasonic treatment, are dropped onto a central part of the stainless steel spacer. (The sample solution is dropped until the droplets of the sample solution cover the entire stainless steel spacer (approximately two droplets are required), because an accurate value cannot be measured if the solution stays inside the stainless steel spacer by surface tension.) Subsequently, another sheet of cover glass (18×18 mm) is placed on the stainless steel spacer. (At this time, no air should enter an inside of the stainless steel spacer.) Load is applied onto the sheet of cover glass for 30 seconds with use of a weight weighing 300 g. (It is preferable to install a waste cloth made of paper (product name: KimWipes) on an upper surface and a lower surface of the sheets of cover glass so that an overflowing toluene solution can be collected.) After the weight is removed, the inside of the stainless steel spacer is observed with use of a digital microscope. The operations and observation above are conducted within 10 minutes from completion of the ultrasonic irradiation of the procedure (2).

(5) Imaging Method

An image of the toluene solution is captured by high dynamic range (HDR) observation.

(6) Image Processing Method

With use of area measuring software among applications of the device above, the image obtained is subjected to histogram extraction with a designated luminance in a range of 0 to 130. An image thus obtained is subjected to binarization so as to obtain a black-and-white image.

(7) Calculation of Area of Graphite

A total area ($mm^2$) of a black part in the image obtained by the above-described observation and image processing methods is calculated. Note that the observation and image processing are carried out with respect to given seven portions inside the stainless steel spacer.

Total area of black part per 1 $mm^2$ ($mm^2/mm^2$)=total area of black part ($mm^2$)/area of entire screen ($mm^2$)

Amount of graphite in samples (g)=amount of samples (g)×graphite content in each sample (%)/100

Concentration of graphite in solution (g/g)=amount of graphite in sample (g)/toluene 10 g Area of graphite per unit solution concentration in 1 mm² ({mm²/mm²}/{g/g})=total area of black part per 1 mm² (mm²/mm²)/concentration of graphite in solution (g/g)

An average value among the seven portions is defined as an area of graphite per unit solution concentration in 1 mm² ({mm²/mm²}/{g/g})

(Ratio of Area Taken Up by Graphite in Surface Layer of Expanded Molded Product)

A ratio of an area taken up by graphite in a surface layer of an expanded molded product having an expansion ratio of 40 times was obtained by measurement and analysis in the following procedure.

(1) Conditions of Observation Device

Device: DIGITAL MICROSCOPE VHX-5000, produced by KEYENCE

Lens used: VH-Z100R; aperture ring fully opened

Illumination: side illumination is employed with a ring illumination base unit OP-72400 and a variable illumination attachment OP-72404 which are connected.

Magnification for observation: 300

Size of captured image: 1600×1200

(2) Imaging Method

An image of a surface of the molded product is captured by high dynamic range (HDR) observation with adjustment of the following conditions.

Brightness: 100

Texture emphasis: 50

Contrast: 0

Color adjustment: 0

(3) Image Processing Method

With use of area measuring software among applications of the device above, the image obtained is subjected to histogram extraction with a designated luminance in a range of 0 to 100 and a fill-up processing. An image thus obtained of the surface of the molded product is subjected to binarization so as to obtain a black-and-white image.

(4) Calculation of Ratio of Area Taken Up by Graphite

An area ratio of a black part in the image obtained by the above-described observation and image processing methods is calculated. Note that the observation and image processing are carried out with respect to given seven portions on the surface of the molded product, and an average value of area ratio of a black part among the seven portions for observation is defined as a ratio (%) of an area taken up by graphite in the surface layer of the expanded molded product having an expansion ratio of 40 times.

(5) Calculation of Value Obtained by Dividing Ratio of Area Taken Up by Graphite by Graphite Content On the basis of the above-described ratio of an area taken up by graphite and a graphite content, a value obtained by dividing, by the graphite content, the ratio of an area taken up by graphite was calculated in accordance with the following formula.

Value obtained by dividing ratio of area taken up by graphite by graphite content (unit: none)=ratio of area taken up by graphite (%)/graphite content (wt %)×100

(Measurement of Bromine Content)

After performing an oxygen flask combustion method, a bromine content was obtained by performing quantitative analysis of bromine by ion chromatography (hereinafter, "IC").

(1) Oxygen Flask Combustion Method

A sample (5 mg of a styrene resin expanded molded product) was placed on a center of a sheet of filter paper including a fuse section, and the sheet of filter paper was folded in three in a longitudinal direction while the fuse section remained fixed. Then, the sheet of filter paper was folded in three in a lateral direction, and the sheet of filter paper containing the sample was put in a platinum basket attached to a stopper section (glass plug) of a 500 mL combustion flask. Meanwhile, 25 ml of an absorbing liquid (ultra pure water into which a drop of hydrous hydrazine has been dropped) was put in an Erlenmeyer flask, which served as a combustion flask, and the Erlenmeyer flask was further filled with oxygen.

The fuse section of the sheet of filter paper was ignited, and the platinum basket in which the sheet of filter paper was fixed was inserted into the Erlenmeyer flask to combust the sample inside the Erlenmeyer flask. After completion of the combustion, the combustion flask was tilted and shaken for 2 minutes and then was left for 1 hour, so that bromine generated by the combustion was absorbed by the absorbing liquid.

(2) IC

The absorbing liquid obtained by the oxygen flask combustion method was subjected to IC to measure an amount of a bromine ion.

Device used: ICS-2000, produced by Dionex

Column: IonPac AG18, AS18 (diameter 4 mm×250 mm)

Eluent: KOH gradient (eluent generator was used)

Flow rate of eluent: 1.0 mL/min

Amount of sample introduced: 50 µl

Detector: electrical conductivity detector

A concentration of bromine in the sample was calculated in accordance with the following formula.

Concentration of bromine in sample (%)=[{result of IC measurement of styrene resin expanded molded product (mg/l)−result of background test (mg/l)}×25 (ml)×1000]/{amount of sample collected (mg)×10000}

(Measurement of Expansion Ratio and Evaluation of Expandability and Moldability)

As with the case of measuring thermal conductivity, a sample having a size of length 300 mm×width 300 mm×thickness 25 mm was cut out from the styrene resin expanded molded product. A weight (g) of the sample was measured, and a longitudinal size, a lateral size, and a thickness size were measured with use of a vernier caliper. On the basis of the sizes thus measured, a volume (cm³) of the sample was calculated, and an expansion ratio was calculated in accordance with the following calculation formula.

Expansion ratio (cm³/g)=sample volume (cm³)/weight of sample (g)

Note that as described above, the unit "times" for an expansion ratio of the styrene resin expanded molded product is also expressed with use of a unit "cm³/g" in accordance with custom.

Further, with respect to molded products obtained, observation of a surface of a molded product having an expansion ratio of 70 times was conducted so as to make a judgment such that the molded product had a good surface appearance if the molded product had few gaps between particles, and the molded product had a bad surface appearance if the molded product had many gaps between particles.

On the basis of an expansion ratio measured and an appearance of a surface of a molded product, expandability and moldability of styrene resin expanded molded product were evaluated. Evaluation of expandability and moldability is expressed as follows. Good: the styrene resin expanded molded product is expandable at an expansion ratio of 70 times and allows obtaining a molded product with a good appearance. Average: the styrene resin expanded molded product is expandable at an expansion ratio of 70 times but does not easily allow obtaining a molded product with a good appearance. Bad: the styrene resin expanded molded product is not expandable at an expansion ratio of 70 times.

(Evaluation of Flame Retardancy)

An expanded molded product prepared was left to stand still at a temperature of 60° C. for 48 hours and was further left to stand still at a temperature of 23° C. for 24 hours. Thereafter, an oxygen index was measured in accordance with JIS K7201.

(Method of Measuring Average Cell Diameter of Styrene Resin Expanded Molded Product)

A styrene resin expanded molded product having an expansion ratio 50 times was cut with use of a razor, and a cross section of the styrene resin expanded molded product was observed with use of an optical microscope. The number of cells existing in a range of a 1000 μm×1000 μm square of the cross section was counted, and a value measured in accordance with the following formula (area average diameter) was used as an average cell diameter. Five average cell diameters were measured with respect to each sample, and an average of the five average cell diameters was used as a standard average cell diameter.

$$\text{Average cell diameter (μm)} = 2 \times [1000 \text{ μm} \times 1000 \text{ μm}/(\text{number of cells} \times \pi)]^{1/2}.$$

Raw materials used in the examples and the comparative examples are as follows.

(Styrene Resin)

(A) Styrene homopolymer [680, produced by PS Japan Corporation]

(Graphite)

(B1) Graphite [scale-like graphite SGP-40B, produced by MARUTOYO Co., Ltd.]

Laser scattering intensity per unit solution concentration of graphite: 4.0 {%/(mg/ml)}/wt %

(B2) Graphite [flake graphite BF-3AK, produced by Chuetsu Graphite Works Co., Ltd.]

Laser scattering intensity per unit solution concentration of graphite: 5.6 {%/(mg/ml)}/wt %

(B3) Graphite [flake graphite BF-1AT, produced by Chuetsu Graphite Works Co., Ltd.]

Laser scattering intensity per unit solution concentration of graphite: 9.1 {%/(mg/ml)}/wt %

(B4) Graphite [flake graphite BF-10AK, produced by Chuetsu Graphite Works Co., Ltd.]

Laser scattering intensity per unit solution concentration of graphite: 3.2 {%/(mg/ml)}/wt %

(B5) Graphite [scale-like graphite UCP, produced by Nippon Graphite Industry Co., Ltd.]

Laser scattering intensity per unit solution concentration of graphite: 3.6 {%/(mg/ml)}/wt %

(Bromine Flame Retardant)

(C1) 2,2-bis[4-(2,3-dibromo-2-methylpropoxy)-3,5-dibromophenyl]propane [SR-130, produced by Dai-ichi Kogyo Seiyaku Co., Ltd.; bromine content=66 wt %]

(C2) Brominated (styrene-butadiene copolymer) [EMERALD INNOVATION 3000, produced by Chemtula; bromine content=65 wt %]

(Thermal Stabilizer)

(D1) Tetrakis(2,2,6,6-tetramethylpiperidyloxycarbonyl) butane [LA-57, produced by ADEKA CORPORATION]

(D2) Bis(2,6-di-t-butyl-4-methylphenyl)pentaerythritol diphosphite [PEP-36, produced by ADEKA CORPORATION]

(D3) 3,9-bis(2,4-di-tert-butylphenoxy)-2,4,8,10-tetraoxa-3,9-diphospha-spiro [5.5] undecane [Ultranox626, produced by ADDIVANT]

(D4) Pentaerythritol tetrakis[3-(3',5'-di-tert-butyl-4'-hydroxyphenyl)propionate] [ANOX20, produced by ADDIVANT]

(D5) Cresol-novolac type epoxy resin [ECN-1280, produced by HUNTSMAN Japan; epoxy equivalent: 212 to 233 g/eq.]

(Radical Generator)

(E) Poly-1,4-diisopropyl benzene [CCPIB, produced by UNITED INITIATORS]

(Foaming Agent)

(F1) Normal pentane [sample drug produced by Wako Pure Chemical Industries, Ltd.,]

(F2) Isopentane [sample drug produced by Wako Pure Chemical Industries, Ltd.]

(Other Additives)

(G) Amide ethylene-bis-stearate [ALFLOW H-50S, produced by Nichiyu Corporation]

(Graphite Master Batch)

(I1) Into a Banbury mixer, 49 wt % of the styrene homopolymer (A), 50 wt % of the graphite (B1), 1 wt % of the amide ethylene-bis-stearate (G) were introduced as raw materials so as to achieve a total weight (A+B1+G) of 100 wt %, and were melt and knead for 20 minutes under a load of 5 kgf/cm$^2$ and without heating and cooling. At this time, a temperature of a resin was measured to be 180° C. The resin was supplied to an extruder, and was extruded through a die, which was attached to a tip of the extruder and had small holes, at a discharge rate of 250 kg/hr into a form of strands of resin. The strands of resin were cooled so as to be solidified in a water tank at 30° C., and then were cut so as to obtain a master batch. The master batch had a graphite content of 50 wt %. In the master batch obtained, a laser scattering intensity per unit solution concentration of graphite was b=6.1 {%/(mg/ml)}/wt %. Note that a laser scattering intensity of graphite SGP40B before being kneaded was a=4.0 {%/(mg/ml)}/wt %. Accordingly, b=1.53a.

(I2) A graphite master batch (I2) was obtained by a similar technique as that in the case of (I1) except that a type of graphite was changed from (B1) to (B2). In the master batch obtained, a laser scattering intensity per unit solution concentration of graphite was b=8.8 {%/(mg/ml)}/wt %. Note that a laser scattering intensity of graphite BF-3AK before being kneaded was a=5.6 {%/(mg/ml)}/wt %. Accordingly, b=1.57a.

(I3) A graphite master batch (I3) was obtained by a similar technique as that in the case of (I1) except that a type of graphite was changed from (B1) to (B3). In the master batch obtained, a laser scattering intensity per unit solution concentration of graphite was b=9.9 {%/(mg/ml)}/wt %. Note that a laser scattering intensity of graphite BF-1AT before being kneaded was a=9.1 {%/(mg/ml)}/wt %. Accordingly, b=1.09a.

(I4) A graphite master batch (I4) was obtained by a similar technique as that in the case of (I1) except that a type of graphite was changed from (B1) to (B4). In the master batch obtained, a laser scattering intensity per unit solution concentration of graphite was b=5.7 {%/(mg/ml)}/wt %. Note that a laser scattering intensity of graphite BF-10AK before being kneaded was a=3.2 {(%/(mg/ml)}/wt %. Accordingly, b=1.78a.

(I5) A graphite master batch (I5) was obtained by a similar technique as that in the case of (I1) except that a type of graphite was changed from (B1) to (B5). In the master batch obtained, a laser scattering intensity per unit solution concentration of graphite was b=4.7 {%/(mg/ml)}/wt %. Note that a laser scattering intensity of graphite UCP before being kneaded was a=3.6 {%/(mg/ml)}/wt %. Accordingly, b=1.31a.

(I6) A graphite master batch (I6) was obtained by a similar technique as that in the case of (I1) except that a load applied by the Banbury mixer was 4.5 kgf/cm$^2$, a duration of kneading was 15 minutes, and a resin temperature was 160° C. In the master batch obtained, a laser scattering intensity per unit solution concentration of graphite was b=5.9 {%/(mg/ml)}/wt %. Accordingly, b=1.48a.

(I7) A graphite master batch (I7) was obtained by a similar technique as that in the case of (I1) except that a load applied by the Banbury mixer was 5.5 kgf/cm$^2$, a duration of kneading was 15 minutes, and a resin temperature was 170° C. In the master batch obtained, a laser scattering intensity per unit solution concentration of graphite was b=8.0 {%/(mg/ml)}/wt %. Accordingly, b=2.00a.

(I8) A graphite master batch (I8) was obtained by a similar technique as that in the case of (I1) except that a load applied by the Banbury mixer was 3.5 kgf/cm$^2$, a duration of kneading was 15 minutes, and a resin temperature was 160° C. In the master batch obtained, a laser scattering intensity per unit solution concentration of graphite was b=5.3 {%/(mg/ml)}/wt %. Accordingly, b=1.33a.

(I9) A graphite master batch (I9) was obtained by a similar technique as that in the case of (I1) except that a load applied by the Banbury mixer was 5.5 kgf/cm$^2$, a duration of kneading was 20 minutes, and a resin temperature was 180° C. In the master batch obtained, a laser scattering intensity per unit solution concentration of graphite was b=9.1 {%/(mg/ml)}/wt %. Accordingly, b=2.28a.

(Master Batch as Mixture of Bromine Flame Retardant and Thermal Stabilizer)

(J1) The styrene homopolymer (A) was supplied to a twin-screw extruder so as to be melt and kneaded. Then, in a halfway position of the extruder, a mixture of the bromine flame retardant (C1) and the stabilizers (D1) and (D2) was supplied so as to be further melt and kneaded. Note that a weight ratio the materials was such that (A):(C1):(D1):(D2)=70:28.5:0.6:0.9, and (A)+(C1)+(D1)+(D2)=100 wt %. Strands of resin were extruded through a die, which was attached to a tip of the extruder and had small holes, at a discharge rate of 300 kg/hr. The strands of resin were cooled so as to be solidified in a water tank at 20° C., and then were cut to obtain a master batch as a mixture of the bromine flame retardant and the thermal stabilizers. In doing so, a temperature of the extruder was set to 170° C. The master batch had a bromine content of 18.8 wt %.

(J2) The styrene homopolymer (A), the bromine flame retardant (C2), and the stabilizers (D3), (D4), and (D5) were supplied to a twin-screw extruder so as to be melt and kneaded. Note that a weight ratio of the materials was such that A:C2:D3:D4:D5=42.25:50:0.25:5:2.5, and A+C2+D3+D4+D5=100 wt %. Strands of resin were extruded through a die, which was attached to a tip of the extruder and had small holes, at a discharge rate of 300 kg/hr. The strands of resin were cooled so as to be solidified in a water tank at 20° C., and then were cut to obtain a master batch as a mixture of the bromine flame retardant and the thermal stabilizers. In doing so, a temperature of the extruder was set to 150° C. The master batch obtained had a bromine content of 32.5 wt %.

Example 1

[Preparation of Expandable Styrene Resin Particles]

The styrene resin (A), the master batch (J1) as the mixture of the bromine flame retardant and the thermal stabilizers, and the graphite master batch (I1) prepared as described above with use of the Banbury mixer were introduced into a blender so as to be blended for 10 minutes to produce a resin mixture. A weight ratio of the materials was such that (A):(J1):(I1)=83.65:8.35:8.00, and (A)+(J1)+(I1)=100 wt %.

A resultant resin mixture was supplied to a tandem two-stage extruder, in which a co-rotating twin-screw extruder (first extruder) having a screw diameter of 40 mm and a single-screw extruder (second extruder) having a screw diameter of 90 mm was connected in series. The resin mixture was melt and kneaded with a temperature of the extruder having a screw diameter of 40 mm set to 190° C. and at a rotation speed of 150 rpm. In a halfway position of the extruder having a screw diameter of 40 mm (first extruder), 7 parts by weight of a mixed pentane [a mixture of 80 wt % of normal pentane (F1) and 20 wt % of isopentane (F2)] was injected with respect to 100 parts by weight of the resin composition. Subsequently, through a continuous pipe which was set to 200° C., a resultant product was supplied to the extruder (second extruder) having a screw diameter of 90 mm.

A melt resin was cooled in the extruder (second extruder) having a screw diameter of 90 mm until a resin temperature was 160° C. Subsequently, through a die which was attached to a tip of the second extruder set to 250° C. and had 60 small holes each having a diameter of 0.65 mm and a land length of 3.0 mm, the melt resin was extruded in a discharge amount of 50 kg/hour into pressurized circulating water at a temperature of 60° C. and 0.8 MPa. The melt resin thus extruded was cut into particles with use of a rotating cutter, which was in contact with the die and had 10 blades, under a condition of 1500 rpm, and was transferred to a centrifugal dehydrator. Thus obtained were expandable styrene resin particles. Note that a duration of stay in the first extruder was 2 minutes, and a duration of stay in the second extruder was 5 minutes.

0.08 parts by weight of zinc stearate was dry-blended with 100 parts by weight of the obtained expandable styrene resin particles, and a resultant product was stored at 15° C.

[Preparation of Pre-Expanded Particles]

Expandable styrene resin particles were prepared, and were stored at 15° C. for 2 weeks. Then, the expandable styrene resin particles were introduced to a pre-expanding apparatus [BHP-300, produced by Obiraki Industry Co., Ltd.], and steam at a pressure of 0.08 MPa was introduced into the pre-expanding apparatus so as to cause expansion. Thus obtained were pre-expanded particles having an expansion ratio of 40 times.

Similarly, pre-expanded particles having an expansion ratio of 50 times and pre-expanded particles having an expansion ratio of 70 times were obtained.

[Preparation of Styrene Resin Expanded Molded Product]

The obtained pre-expanded particles, which respectively had an expansion ratio of 40 times, 50 times, and 70 times, were each supplied to fill inside a mold (length 450 mm×width 310 mm×thickness 25 mm) attached to a molding apparatus for styrene foam [KR-57, produced by Daisen Co., Ltd.]. Steam at a pressure of 0.06 MPa was introduced so as to cause in-mold expansion, and then water was sprayed onto the mold for 3 seconds so as to cool the mold. The styrene resin expanded molded product was held inside the mold until a pressure at which the styrene resin expanded molded product pushed the mold reached 0.015 MPa (gage pressure). Then, the styrene resin expanded molded product was taken out. Thus obtained were styrene resin expanded molded products each having a rectangular parallelepiped shape. The styrene resin expanded molded products had an expansion ratio of 40 times, 50 times, and 70 times, respectively.

With respect to the expandable styrene resin particles, the pre-expanded particles, and the styrene resin expanded molded products obtained in Example 1, graphite content, mean particle size D50 of graphite, laser scattering intensity, area of graphite per unit solution concentration, ratio of an area taken up by graphite in a surface layer of an expanded molded product having an expansion ratio of 40 times, bromine flame retardant content, expansion ratio, average cell diameter, moldability, flame retardancy, and thermal conductivities A and B were measured in accordance with the above-described methods. Measurement results and evaluation results are shown in Table. 2. Note that a preparation method in Example 1 will be referred to as a production method (a).

Example 2

Styrene resin expanded molded products were prepared by a similar process (production method (a)) as in Example 1, except that [Preparation of expandable styrene resin particles] was altered so as to use 85.25 wt % of the styrene resin (A), 8.35 wt % of the master batch (J1) as the mixture of the bromine flame retardant and the thermal stabilizers, and 6.40 wt % of the graphite master batch (I1).

Evaluation was made in a similar manner to Example 1. Measurement results and evaluation results are shown in Table. 2.

Example 3

Styrene resin expanded molded products were prepared by a similar process (production method (a)) as in Example 1, except that [Preparation of expandable styrene resin particles] was altered so as to use 79.65 wt % of the styrene resin (A), 8.35 wt % of the master batch (J1) as the mixture of the bromine flame retardant and the thermal stabilizers, and 12.0 wt % of the graphite master batch (I1).

Evaluation was made in a similar manner to Example 1. Measurement results and evaluation results are shown in Table. 2.

Example 4

Styrene resin expanded molded products were prepared by a similar process (production method (a)) as in Example 1, except that [Preparation of expandable styrene resin particles] was altered so as to use 86.65 wt % of the styrene resin (A), 8.35 wt/n % of the master batch (J1) as the mixture of the bromine flame retardant and the thermal stabilizers, and 5.0 wt % of the graphite master batch (I1).

Evaluation was made in a similar manner to Example 1. Measurement results and evaluation results are shown in Table. 2.

Example 5

Styrene resin expanded molded products were prepared by a similar process (production method (a)) as in Example 1, except that [Preparation of expandable styrene resin particles] was altered so as to use 75.65 wt % of the styrene resin (A), 8.35 wt % of the master batch (J1) as the mixture of the bromine flame retardant and the thermal stabilizers, and 16.0 wt % of the graphite master batch (I1).

Evaluation was made in a similar manner to Example 1. Measurement results and evaluation results are shown in Table. 2.

Example 6

Styrene resin expanded molded products were prepared by a similar process (production method (a)) as in Example 1, except that the graphite master batch used in [Preparation of expandable styrene resin particles] was changed to the graphite master batch (I2).

Evaluation was made in a similar manner to Example 1. Measurement results and evaluation results are shown in Table. 2.

Example 7

Styrene resin expanded molded products were prepared by a similar process (production method (a)) as in Example 1, except that the graphite master batch used in [Preparation of expandable styrene resin particles] was changed to the graphite master batch (I4).

Evaluation was made in a similar manner to Example 1. Measurement results and evaluation results are shown in Table. 2.

Example 8

Styrene resin expanded molded products were prepared by a similar process (production method (a)) as in Example 1, except that the graphite master batch used in [Preparation of expandable styrene resin particles] was changed to the graphite master batch (I6).

Evaluation was made in a similar manner to Example 1. Measurement results and evaluation results are shown in Table. 2.

Example 9

Styrene resin expanded molded products were prepared by a similar process (production method (a)) as in Example 1, except that the graphite master batch used in [Preparation of expandable styrene resin particles] was changed to the graphite master batch (I7).

Evaluation was made in a similar manner to Example 1. Measurement results and evaluation results are shown in Table. 2.

Example 10

Styrene resin expanded molded products were prepared by a similar process (production method (a)) as in Example 1, except that the graphite master batch used in [Preparation of expandable styrene resin particles] was changed to the graphite master batch (I8).

Evaluation was made in a similar manner to Example 1. Measurement results and evaluation results are shown in Table. 2.

Example 11

Styrene resin expanded molded products were prepared by a similar process (production method (a)) as in Example 1, except that the graphite master batch used in [Preparation of expandable styrene resin particles] was changed to the graphite master batch (I9).

Evaluation was made in a similar manner to Example 1. Measurement results and evaluation results are shown in Table. 2.

Example 12

Styrene resin expanded molded products were prepared by a similar process (production method (a)) as in Example 1, except that [Preparation of expandable styrene resin particles] was altered so as to use 88.28 wt % of the styrene resin (A), 3.72 wt % of the master batch (J1) as the mixture of the bromine flame retardant and the thermal stabilizers, and 8.0 wt % of the graphite master batch (I1).

Evaluation was made in a similar manner to Example 1. Measurement results and evaluation results are shown in Table. 2.

Example 13

[Preparation of Styrene Resin Particles]

The styrene resin (A), the master batch (J1) as a mixture of the bromine flame retardant and the thermal stabilizers, and the graphite master batch (I1) were introduced into a blender so as to be blended for 10 minutes to produce a resin mixture. A weight ratio of the materials was such that (A):(J1):(I1)=83.65:8.35:8.00, and (A)+(J1)+(I1)=100 wt %.

The resin composition obtained was supplied to a single-screw extruder having a screw diameter of 90 mm, and was melt and kneaded in the extruder. Through a die which was attached to a tip of the extruder and had 140 small holes each having a diameter of 1.4 mm, strands of resin were extruded in a discharge amount of 335 kg/hour into a water tank at 20° C. so as to be cooled and solidified. Then, styrene resin particles were obtained with use of a strand cutter. Note that the resin had a temperature of 245° C. at a tip section of the extruder, and a duration of time during which the resin stayed in the extruder was 3 minutes.

[Preparation of Expandable Styrene Resin Particles]

100 parts by weight of the styrene resin particles obtained, 200 parts by weight of deionized water, 1 part by weight of tricalcium phosphate, 0.03 parts by weight of sodium dodecylbenzenesulfonate, and 4 parts by weight of sodium chloride were introduced into an autoclave having a volume of 6 L and including a stirring device, and the autoclave was sealed. Subsequently, a resultant mixture was heated up to 105° C. over a period of 1 hour, and then 8 parts by weight of mixed pentane [a mixture of 80 wt %/o of normal pentane (F1) and 20 wt % of isopentane (F2)] was added as a foaming agent into the autoclave over a period of 25 minutes. Then, the temperature was increased up to 115° C. over a period of 10 minutes, and was maintained for 4 hours.

Subsequently, the temperature was cooled down to room temperature, and resin particles, which were impregnated with the foaming agent, were taken out from the autoclave. The resin particles were subjected to acid cleaning with hydrochloric acid, were rinsed with water, and were dewatered with a centrifuge. Then, water adhering to the resin particles surface was dried with use of a pneumatic conveying dryer to obtain expandable styrene resin particles.

100 parts by weight of the expandable styrene resin particles obtained were dry-blended with 0.08 parts by weight of zinc stearate, and then were stored at 15° C.

In [Preparation of pre-expanded particles] and [Preparation of styrene resin expanded molded product], similar processes as in Example 1 to prepare styrene resin expanded molded products.

Evaluation was made in a similar manner to Example 1. Measurement results and evaluation results are shown in Table. 2.

Example 14

In [Preparation of expandable styrene resin particles], the styrene resin (A), the master batch (J2) as the mixture of the bromine flame retardant and the thermal stabilizers, the graphite master batch (I1), and the radical generator (E) were introduced into a blender so as to be blended for 10 minutes to obtain a resin mixture. A weight ratio of the materials was such that (A):(J2):(I1):(E)=87.05:4.75:8.00:0.20, and (A)+(J2)+(I1)+(E)=100 wt %. Styrene resin expanded molded products were prepared by a similar process (production method (a)) as in Example 1 except that a formulation was changed as described above.

Evaluation was made in a similar manner to Example 1. Measurement results and evaluation results are shown in Table. 2.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Conditions of preparation of graphite master batch | Production method Type of granite Type of graphite master batch | — — | (a) (B1) (I1) | (a) (B1) (I1) | (a) (B1) (I1) | (a) (B1) (I1) | (a) (B1) (I1) | (a) (B2) (I2) | (a) (B4) (I4) | (a) (B1) (I6) | (a) (B1) (I7) | (a) (B1) (I8) | (a) (B1) (I9) | (a) (B1) (I1) | (c) (B1) (I1) | (a) (B1) (I1) |
| | Load of kneading with Banbury mixer | kgf/cm² | 5 | 5 | 5 | 5 | 5 | 5 | 5 | 4.5 | 5.5 | 3.5 | 5.5 | 5 | 5 | 5 |
| | Time of kneading with Banbury mixer | min. | 20 | 20 | 20 | 20 | 20 | 20 | 20 | 15 | 15 | 15 | 20 | 20 | 20 | 20 |
| | Temperature of resin when dispensed from Banbury mixer | ° C. | 180 | 180 | 180 | 180 | 180 | 180 | 180 | 160 | 170 | 160 | 180 | 180 | 180 | 180 |
| Conditions of preparation of expandable styrene resin particles | Combination ratio Styrene resin (A) | wt % | 83.65 | 85.25 | 79.65 | 86.65 | 75.65 | 83.65 | 83.65 | 83.65 | 83.65 | 83.65 | 83.65 | 88.28 | 83.65 | 87.05 |
| | Bromine flame retardant maseter batch (J1) | wt % | 8.35 | 8.35 | 8.35 | 8.35 | 8.35 | 8.35 | 8.35 | 8.35 | 8.35 | 8.35 | 8.35 | 3.72 | 8.35 | |
| | Bromine flame retardant maseter batch (J2) | wt % | | | | | | | | | | | | | | 4.75 |
| | Graphite maseter batch (J2) | wt % | 8.00 | 6.40 | 12.00 | 5.00 | 16.00 | 8.00 | 8.00 | 8.00 | 8.00 | 8.00 | 8.00 | 8.00 | 8.00 | 8.00 |
| | Graphite maseter batch (I) | wt % | | | | | | | | | | | | | | |

TABLE 1-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|
| Graphite (B) | wt % | | | | | | | | | | | | | | |
| Radical generator (E) | wt % | | | | | | | | | | | | | | 0.20 |
| Extruder screw rotation speed | rpm | 150 | 150 | 150 | 150 | 150 | 150 | 150 | 150 | 150 | 150 | 150 | 150 | 150 | 150 |

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Analysis results | Expandable styrene resin particles | Graphite content (wt %) | 3.7 | 2.9 | 5.7 | 2.2 | 7.7 | 3.8 | 3.7 | 3.7 | 3.7 | 3.7 | 3.7 | 3.7 | 3.7 | 3.7 |
| | | Graphite mean particle size D50 (Y) (μm) | 5.1 | 5.1 | 5.1 | 5.1 | 5.1 | 3.1 | 8.5 | 5.1 | 5.1 | 5.1 | 5.1 | 5.1 | 5.1 | 5.1 |
| | | Laser scattering intensity per unit solution concentration of expandable styrene resin particles (%/(mg/ml)) | 26.6 | 18.9 | 37.1 | 14.1 | 48.5 | 33.8 | 21.1 | 22.2 | 33.3 | 20.4 | 29.6 | 25.5 | 23.7 | 25.9 |
| | | Laser scattering intensity (X) per unit solution concentration of graphite {%/(mg/ml)}/wt % | 7.2 | 6.5 | 6.5 | 6.4 | 6.3 | 8.9 | 5.7 | 6.0 | 8.0 | 5.5 | 9.0 | 6.9 | 6.4 | 7.0 |
| | | X + Y | 12.3 | 11.6 | 11.6 | 11.5 | 11.4 | 12.0 | 14.2 | 11.1 | 13.1 | 10.6 | 14.1 | 12.0 | 11.5 | 12.1 |
| | | Area of graphite per unite solution concentration within 1 mm² {mm²}/{g/g} | 73.9 | 67.0 | 66.8 | 65.8 | 64.7 | 91.5 | 58.6 | 61.7 | 82.2 | 56.5 | 92.5 | 70.9 | 65.8 | 71.9 |
| | Expanded molded product | Laser scattering intensity per unit solution concentration of expanded molded product (%/(mg/ml)) | 27.3 | 18.7 | 37.4 | 13.9 | 49.0 | 34.0 | 21.0 | 22.4 | 33.0 | 20.3 | 30.0 | 25.4 | 23.5 | 26.0 |
| | | Area of graphite per unite solution concentration within 1 mm² {mm²}/{g/g} | 75.7 | 66.1 | 67.3 | 64.8 | 65.3 | 91.8 | 58.2 | 62.1 | 91.5 | 56.3 | 83.2 | 70.4 | 65.1 | 72.1 |
| | | Bromine content (wt %) | 1.5 | 1.5 | 1.5 | 1.5 | 1.5 | 1.5 | 1.5 | 1.5 | 1.5 | 1.5 | 1.5 | 0.70 | 1.5 | 1.5 |
| | | Average cell diameter (μm) | 152 | 154 | 149 | 156 | 146 | 150 | 154 | 153 | 150 | 154 | 151 | 153 | 103 | 152 |

TABLE 2-continued

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Expanded molded product with expansion ratio of 40 times | Ratio of area taken up by graphite | % | 4.74 | 3.94 | 6.56 | 3.26 | 7.80 | 5.20 | 3.70 | 3.75 | 5.11 | 3.72 | 4.99 | 4.43 | — | 4.45 |
| | Ratio of area taken up by graphite/graphite content ×100 | — | 128 | 136 | 115 | 148 | 101 | 137 | 100 | 101 | 138 | 101 | 135 | 120 | — | 120 |
| | Bromine content | wt % | 1.5 | 1.5 | 1.5 | 1.5 | 1.5 | 1.5 | 1.5 | 1.5 | 1.5 | 1.5 | 1.5 | 0.70 | — | 1.5 |
| Characteristics | Expandability and moldability | — | good | good | good | good | average | good | average | good | good | good | good | good | good | good |
| | Heat insulating property | Thermal conductivity A of molded product with expansion ratio of 50 times | W/mK | 0.0282 | 0.0288 | 0.0280 | 0.0289 | 0.0278 | 0.0282 | 0.0284 | 0.0283 | 0.0280 | 0.0284 | 0.0281 | 0.0282 | 0.0283 | 0.0282 |
| | | Thermal conductivity A of molded product with expansion ratio of 70 times | W/mK | 0.0297 | 0.0303 | 0.0295 | 0.0307 | 0.0293 | 0.0294 | 0.0295 | 0.0298 | 0.0295 | 0.0298 | 0.0294 | 0.0297 | 0.0291 | 0.0289 |
| | | Thermal conductivity B of molded product with expansion ratio of 50 times | W/mK | 0.0304 | 0.0310 | 0.0302 | 0.0310 | 0.0300 | 0.0304 | 0.0305 | 0.0305 | 0.0302 | 0.0308 | 0.0303 | 0.0304 | 0.0305 | 0.0305 |
| | | Thermal conductivity B of molded product with expansion ratio of 70 times | W/mK | 0.0317 | 0.0323 | 0.0315 | 0.0324 | 0.0313 | 0.0319 | 0.0320 | 0.0320 | 0.0317 | 0.0323 | 0.0316 | 0.0319 | 0.0319 | 0.0317 |
| Flame retardancy | Oxygen index | % | 28 | 28 | 27 | 28 | 27 | 28 | 28 | 28 | 28 | 28 | 28 | 25 | 28 | 29 |

Comparative Example 1

Styrene resin expanded molded products were prepared by a similar process (production method (a)) as in Example 1, except that [Preparation of expandable styrene resin particles] was altered so as to use 87.65 wt % of the styrene resin (A), 8.35 wt % of the master batch (J1) as the mixture of the bromine flame retardant and the thermal stabilizers, and 4.0 wt % of the graphite master batch (I1).

Evaluation was made in a similar manner to Example 1. Measurement results and evaluation results are shown in Table. 4.

Comparative Example 2

Styrene resin expanded molded products were prepared by a similar process (production method (a)) as in Example 1, except that [Preparation of expandable styrene resin particles] was altered so as to use 73.65 wt % of the styrene resin (A), 8.35 wt % of the master batch (J1) as the mixture of the bromine flame retardant and the thermal stabilizers, and 18.0 wt % of the graphite master batch (I1).

Evaluation was made in a similar manner to Example 1. Measurement results and evaluation results are shown in Table. 4.

Comparative Example 3

Styrene resin expanded molded products were prepared by a similar process (production method (a)) as in Example 1, except that the graphite master batch used in [Preparation of expandable styrene resin particles] was changed to the graphite master batch (I3).

Evaluation was made in a similar manner to Example 1. Measurement results and evaluation results are shown in Table. 4.

Comparative Example 4

Styrene resin expanded molded products were prepared by a similar process (production method (a)) as in Example 1, except that the graphite master batch used in [Preparation of expandable styrene resin particles] was changed to the graphite master batch (I5).

Evaluation was made in a similar manner to Example 1. Measurement results and evaluation results are shown in Table. 4.

Comparative Example 5

In Comparative Example 5, powdery graphite (graphite (B1)) was used in [Preparation of expandable styrene resin particles] instead of the graphite master batch. That is, the styrene resin (A), the master batch (J1) as the mixture of the bromine flame retardant and the thermal stabilizers, and the graphite (B1) were introduced into a blender so as to be blended for 10 minutes to obtain a resin mixture. A weight ratio of the materials was such that (A):(J1):(B1)=87.65:8.35:4.00, and (A)+(J1)+(B1)=100 wt %.

In steps subsequent to the resin mixture in [Preparation of expandable styrene resin particles], and in [Preparation of pre-expanded particles] and [Preparation of styrene resin expanded molded product], similar process as in Example 1 was conducted to prepare styrene resin expanded molded products.

Evaluation was made in a similar manner to Example 1. Measurement results and evaluation results are shown in Table. 4. Note that a production method in Comparative Example 5 will be referred to as a production method (b).

Comparative Example 6

Styrene resin expanded molded products were prepared by a similar process (production method (b)) as in Comparative Example 5, except that the graphite used in [Preparation of expandable styrene resin particles] was changed to the graphite (B3).

Evaluation was made in a similar manner to Example 1. Measurement results and evaluation results are shown in Table. 4.

Comparative Example 7

Styrene resin expanded molded products were prepared by a similar process (production method (b)) as in Comparative Example 5, except that the graphite used in [Preparation of expandable styrene resin particles] was changed to the graphite (B4).

Evaluation was made in a similar manner to Example 1. Measurement results and evaluation results are shown in Table. 4.

Comparative Example 8

Styrene resin expanded molded products were prepared by a similar process (production method (b)) as in Comparative Example 5, except that a screw rotation speed of the extruder having a screw diameter of 40 mm was changed from 150 rpm to 300 rpm.

Evaluation was made in a similar manner to Example 1. Measurement results and evaluation results are shown in Table. 4.

TABLE 3

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Production method | | | — | (a) | (a) | (a) | (b) | (b) | (b) | (b) |
| Conditions of preparation of graphite master batch | Type of graphite | | (B1) | (B1) | (B3) | (B5) | (B1) | (B3) | (B4) | (B1) |
| | Type of graphite master batch | | — | (I1) | (I1) | (I3) | (I5) | | | |
| | Load of kneading with Bandury mixer | kgf/cm$^2$ | 5 | 5 | 5 | 5 | | | | |

TABLE 3-continued

| | | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Conditions of preparation of expandable styrene resin particles | | Time of kneading with Banbury mixer | min. | 20 | 20 | 20 | 20 | | | | |
| | | Temperature of resin when dispensed from Banbury mixer | °C. | 180 | 180 | 180 | 180 | | | | |
| | Combination ratio | Styrene resin (A) | wt % | 87.65 | 73.65 | 83.65 | 83.65 | 87.65 | 87.65 | 87.65 | 87.65 |
| | | Bromine flame retardant maseter batch (J1) | wt % | 8.35 | 8.35 | 8.35 | 8.35 | 8.35 | 8.35 | 8.35 | 8.35 |
| | | Bromine flame retardant maseter batch (J2) | wt % | | | | | | | | |
| | | Graphite maseter batch (I) | wt % | 4.00 | 18.00 | 8.00 | 8.00 | | | | |
| | | Graphite (B) | wt % | | | | | 4.00 | 4.00 | 4.00 | 4.00 |
| | | Radical generator (E) | wt % | | | | | | | | |
| | Extruder screw rotation speed | | rpm | 150 | 150 | 150 | 150 | 150 | 150 | 150 | 300 |

TABLE 4

| | | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Analysis results | Expandable styrene resin particles | Graphite content | wt % | 1.7 | 8.7 | 3.7 | 3.7 | 3.7 | 3.7 | 3.7 | 3.7 |
| | | Graphite mean particle size D50 (Y) | μm | 5.2 | 5.2 | 1.8 | 13.0 | 5.7 | 2.2 | 8.5 | 5.0 |
| | | Laser scattering intensity per unit solution concentration of expandable styrene resin particles | %/(mg/ml) | 11.0 | 54.8 | 37.0 | 17.4 | 15.5 | 27.0 | 14.1 | 18.1 |
| | | Laser scattering intensity (X) per unit solution concentration of graphite | {%/(mg/ml)}/wt % | 6.5 | 6.3 | 10.0 | 4.7 | 4.2 | 7.3 | 3.8 | 4.9 |
| | | X + Y | — | 11.7 | 11.5 | 11.8 | 17.7 | 9.9 | 9.5 | 12.3 | 9.9 |
| | | Area of graphite per unite solution concentration within 1 mm² | {mm²/mm²}/{g/g} | 66.5 | 64.7 | 102.8 | 48.3 | 43.2 | 75.0 | 39.2 | 50.3 |

TABLE 4-continued

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| | Expanded molded product | Laser scattering intensity per unit solution concentration of expanded molded product | %/(mg/ml) | 10.8 | 55.0 | 37.3 | 17.0 | 15.7 | 27.2 | 14.0 | 18.4 |
| | | Area of graphite per unite solution concentration within 1 mm$^2$ | {mm$^2$/mm$^2$}/{g/g} | 65.2 | 64.8 | 103.4 | 47.1 | 43.5 | 75.4 | 38.8 | 51.0 |
| | | Bromine content | wt % | 1.5 | 1.5 | 1.5 | 1.5 | 1.5 | 1.5 | 1.5 | 1.5 |
| | | Average cell diameter | μm | 157 | 144 | 149 | 155 | 155 | 152 | 156 | 154 |
| | Expanded molded product with expansion ratio of 40 times | Ratio of area taken up by graphite | % | 3.13 | 8.00 | 6.20 | 2.90 | 3.07 | 5.84 | 2.24 | 3.64 |
| | | Ratio of area taken up by graphite/graphite content ×100 | | — | 174 | 92 | 168 | 78 | 83 | 158 | 61 | 98 |
| | | Bromine content | wt % | 1.5 | 1.5 | 1.5 | 1.5 | 1.5 | 1.5 | 1.5 | 1.5 |
| Characteristics | Expandability and moldability | | — | good | bad | good | average | good | good | good | good |
| | Heat insulating property | Thermal conductivity A of molded product with expansion ratio of 50 times | W/mK | 0.0292 | 0.0277 | 0.0294 | 0.0300 | 0.0292 | 0.0302 | 0.0295 | 0.0291 |
| | | Thermal conductivity A of molded product with expansion ratio of 70 times | W/mK | 0.312 | un-available | 0.314 | 0.0324 | 0.0302 | 0.0315 | 0.0302 | 0.0300 |
| | | Thermal conuctivity B of molded product with expansion ratio of 50 times | W/mK | 0.0315 | 0.0299 | 0.0316 | 0.0324 | 0.0313 | 0.0318 | 0.0318 | 0.0312 |
| | | Thermal conuctivity B of molded product with expansion ratio of 70 times | W/mK | 0.0330 | un-available | 0.0330 | 0.0333 | 0.0329 | 0.0336 | 0.0328 | 0.0325 |
| | Flame retardancy | Oxygen index | % | 29 | 26 | 28 | 28 | 28 | 28 | 28 | 28 |

Tables. 2 and 4 show that a thermal conductivity B in cases in which an expansion ratio was 50 times was lower in Examples 1 through 14 (0.0300 W/mK to 0.0310 W/mK) than in Comparative Examples 1 through 8 (except for Comparative Example 2 in which an amount of graphite was extremely large). Further, a lower thermal conductivity B in cases in which an expansion ratio was 70 times was achieved in Examples 1 through 14 (0.0313 W/mK to 0.0324 W/mK) as compared with Comparative Examples 1 through 8. Note here that an expansion ratio of 70 times was not achieved in Comparative Example 2 due to an extremely high graphite content and a resultant low expandability. Therefore, expandable styrene resin particles which are characterized not only in that (i) a content of graphite is 2.0 wt % to 8.0 wt % with respect to 100 wt % of the expandable styrene resin particles and (ii) the graphite has a mean particle size of 2.5 μm to 9 μm, but also in that (i) a laser scattering intensity per unit solution concentration of the graphite is not less than 5 {%/(mg/ml)}/wt %, (ii) an area of the graphite per unit solution concentration of the graphite is not less than 55 ({mm²/mm²}/{g/g}), or (iii) in a case where the expandable styrene resin particles are pre-expanded and are made into an expanded molded product having an expansion ratio of 40 times, a value obtained by dividing, by the graphite content, a ratio of an area taken up by the graphite in a surface layer of the expanded molded product is not less than 100; pre-expanded particles of a styrene resin of the expandable styrene resin particles; and a styrene resin expanded molded product have both a high expandability and an excellent heat insulating property.

All of the above embodiments are merely illustrative of one embodiment of the present invention, and are in no way intended to limit the embodiment of the present invention thereto. One embodiment of the present invention can be altered in many ways by a skilled person, and therefore the scope of the embodiment of the present invention is defined only by the claims and equivalents thereof.

INDUSTRIAL APPLICABILITY

A styrene resin expanded molded product and an expanded molded product according to one embodiment of the present invention each have an excellent surface appearance, have a high expansion ratio and a high closed cell ratio, have a low thermal conductivity, achieves a significant suppression of increase over time in thermal conductivity, and exhibits a long-lasting excellent heat insulating property. Accordingly, the styrene resin expanded molded product and the expanded molded product are suitably applicable to a food container box, a cool box, a cushioning material, and a heat insulating material for a house or the like.

The invention claimed is:

1. Expandable styrene resin particles comprising graphite, wherein a content of the graphite in the expandable styrene resin particles is 2.0 wt % to 8.0 wt %,
wherein the graphite has a mean particle size of 2.5 μm to 9 μm, and
wherein the expandable styrene resin particles satisfy at least one of the following (i) to (iii):
(i) a laser scattering intensity per unit solution concentration of the graphite is not less than 5 {%/(mg/ml)}/wt %,
wherein the laser scattering intensity per unit solution concentration of the graphite [{%/(mg/ml)}/wt %] is determined by dividing a laser scattering intensity Ob (%) by a unit solution concentration (mg/ml), a quotient of which is further divided by the content of the graphite in the expandable styrene resin particles (wt %),
wherein the laser scattering intensity Ob (%) is determined by the following formula:

$Ob\ (\%) = (1 - Ls/Lb) \times 100$, wherein Ls is a transmitted light intensity of a toluene solution containing the expandable styrene resin particles measured by laser diffractometry using a laser beam at a wavelength of 632.8 nm, and Lb is a transmitted light intensity of toluene measured by the laser diffractometry, and
wherein the unit solution concentration is a concentration of the expandable styrene resin particles in the toluene solution,
(ii) an area of the graphite per unit solution concentration of the graphite in 1 mm² is not less than 55 ({mm²/mm²}/{g/g}),
wherein the area of the graphite per unit solution concentration of the graphite in 1 mm² ({mm²/mm²}/{g/g}) is determined by dividing a total area of the graphite in an optical microscopic image (mm²) by an entire area of the optical microscopic image (mm²), a quotient of which is further divided by a unit solution concentration (g/g),
wherein the optical microscopic image is obtained by binarization of an optical microscopic image of a toluene solution containing the expandable styrene resin particles, and
wherein the unit solution concentration (g/g) is a concentration of the graphite in the toluene solution, and
(iii) when the expandable styrene resin particles are pre-expanded and are made into an expanded molded product having an expansion ratio of 40 times, a value (%/wt %) obtained by dividing, by the content of the graphite (wt %), a percentage of an area occupied by the graphite in a surface layer of the expanded molded product (%), a quotient of which is further multiplied by 100, is not less than 100.

2. The expandable styrene resin particles according to claim 1, wherein the laser scattering intensity per unit solution concentration of the graphite is not less than 6 {%/(mg/ml)}/wt %.

3. The expandable styrene resin particles according to claim 1, wherein the laser scattering intensity per unit solution concentration of the graphite is expressed as X {%/(mg/ml)}/wt % and the mean particle size of the graphite is expressed as Y (μm), X+Y>10.

4. The expandable styrene resin particles according to claim 1, wherein the area of the graphite per unit solution concentration of the graphite in 1 mm² is not less than 60 ({mm²/mm²}/{g/g}).

5. The expandable styrene resin particles according to claim 1, wherein the value is not less than 110.

6. The expandable styrene resin particles according to claim 1, wherein the content of the graphite in the expandable styrene resin particles is 3.0 wt % to 7.0 wt %.

7. The expandable styrene resin particles according to claim 1, wherein the graphite has a mean particle size of 3 μm to 6 μm.

8. The expandable styrene resin particles according to claim 1, wherein in a case where the expandable styrene resin particles are pre-expanded and are made into an expanded molded product having an expansion ratio of 50 times, the expanded molded product has an average cell diameter of 70 μm to 250 μm.

9. The expandable styrene resin particles according to claim 1, wherein in a case where the expandable styrene resin particles are made into an expanded molded product having an expansion ratio of 50 times, the expanded molded product has a thermal conductivity of not more than 0.0310 (W/mK) as measured, at a central temperature of 23° C., in accordance with JIS A9511:2006R after the expanded molded product is left to stand still at a temperature of 50° C. for 30 days and further left to stand still at a temperature of 23° C. for 24 hours.

10. The expandable styrene resin particles according to claim 1, wherein in a case where the expandable styrene resin particles are made into an expanded molded product having an expansion ratio of 70 times, the expanded molded product has a thermal conductivity of not more than 0.0324 (W/mK) as measured, at a central temperature of 23° C., in accordance with JIS A9511:2006R after the expanded molded product is left to stand still at a temperature of 50° C. for 30 days and further left to stand still at a temperature of 23° C. for 24 hours.

11. Pre-expanded particles of a styrene resin, into which expandable styrene resin particles recited in claim 1 are pre-expanded.

12. A styrene resin expanded molded product, into which pre-expanded particles, recited in claim 11, of the styrene resin are molded.

13. A styrene resin expanded molded product comprising graphite,
wherein a content of the graphite in the styrene resin expanded molded product is 2.0 wt % to 8.0 wt %,
wherein the graphite has a mean particle size of 2.5 μm to 9 μm,
wherein a laser scattering intensity per unit solution concentration of the graphite is not less than 5 {%/(mg/ml)}/wt %,
wherein the laser scattering intensity per unit solution concentration of the graphite [{%/(mg/ml)}/wt %] is determined by dividing a laser scattering intensity Ob (%) by a unit solution concentration (mg/ml), a quotient of which is further divided by the content of the graphite in the styrene resin expanded molded product (wt %),
wherein the laser scattering intensity Ob (%) is determined by the following formula:

$$Ob\ (\%) = (1 - Ls/Lb) \times 100,$$

wherein Ls is a transmitted light intensity of a toluene solution containing the styrene resin expanded molded product measured by laser diffractometry using a laser beam at a wavelength of 632.8 nm, and Lb is a transmitted light intensity of toluene measured by the laser diffractometry, and
wherein the unit solution concentration is a concentration of the styrene resin expanded molded product in the toluene solution.

14. The styrene resin expanded molded product according to claim 13, wherein the styrene resin expanded molded product has an expansion ratio of not less than 50 times (cm$^3$/g).

15. The styrene resin expanded molded product according to claim 13, wherein the styrene resin expanded molded product has a thermal conductivity A (W/mK) and an expansion ratio C (cm$^3$/g) which satisfies the following formula (1):

$$A \leq 0.0268 + 0.000045 \times C \qquad \text{Formula (1)}$$

where the thermal conductivity A is a thermal conductivity (W/m·K) as measured, at a central temperature of 23° C., in accordance with JIS A9511:2006R after the styrene resin expanded molded product is left to stand still at a temperature of 50° C. for 48 hours and further left to stand still at a temperature of 23° C. for 24 hours.

16. The styrene resin expanded molded product according to claim 13, wherein the styrene resin expanded molded product has a thermal conductivity B (W/m·K) and an expansion ratio C (cm$^3$/g) which satisfies the following formula (2):

$$B \leq 0.0279 + 0.000065 \times C \qquad \text{Formula (2)}$$

where the thermal conductivity B is a thermal conductivity (W/m·K) as measured, at a central temperature of 23° C., in accordance with JIS A9511:2006R after the styrene resin expanded molded product is left to stand still at a temperature of 50° C. for 30 days and further left to stand still at a temperature of 23° C. for 24 hours.

17. The styrene resin expanded molded product according to claim 13, wherein the styrene resin expanded molded product has an average cell diameter of 70 μm to 250 μm.

* * * * *